(12) United States Patent
Yasuda et al.

(10) Patent No.: US 7,370,714 B2
(45) Date of Patent: May 13, 2008

(54) POWER-DIVIDING DEVICE AND AXLE-DRIVING DEVICE FOR A WORKING VEHICLE

(76) Inventors: Toshifumi Yasuda, c/o Kanzaki Kokyukoki Mfg. Co., Ltd., Inadera 2-Chome, Amagasaki-shi, Hyogo (JP) 661-0981; Shigenori Sakikawa, c/o Kanzaki Kokyukoki Mfg. Co., Ltd., Inadera 2-Chome, Amagasaki-shi, Hyogo (JP) 661-0981; Hiroshi Kitagawara, c/o Kanzaki Kokyukoki Mfg. Co., Ltd., Inadera 2-Chome, Amagasaki-shi, Hyogo (JP) 661-0981

(*) Notice: Subject to any disclaimer, the term of this patent is extended or adjusted under 35 U.S.C. 154(b) by 509 days.

(21) Appl. No.: 10/822,096

(22) Filed: Apr. 12, 2004

(65) Prior Publication Data

US 2004/0237490 A1  Dec. 2, 2004

(30) Foreign Application Priority Data

| Apr. 17, 2003 | (JP) | 2003-113341 |
| Jul. 8, 2003 | (JP) | 2003-193653 |
| Jul. 15, 2003 | (JP) | 2003-197320 |

(51) Int. Cl.
*B60K 17/28* (2006.01)
*B60K 17/10* (2006.01)

(52) U.S. Cl. ............ 180/53.4; 180/306; 180/305; 74/606 R; 74/15.82

(58) Field of Classification Search ............ 180/53.1, 180/53.4, 305–308; 475/83; 74/606 R, 74/730.1, 15.82, 15.86
See application file for complete search history.

(56) References Cited

U.S. PATENT DOCUMENTS 2,708,800 A  *  5/1955  Logus .................. 37/190

| 4,395,865 A | 8/1983 | Davis, Jr. et al. |
| 4,920,733 A | 5/1990 | Berrios |
| 5,809,756 A | 9/1998 | Scag et al. |
| 5,913,950 A | 6/1999 | Matsufuji et al. |
| 6,601,474 B2 * | 8/2003 | Ishimaru et al. ....... 74/665 GA |
| 6,877,580 B2 * | 4/2005 | Hasegawa et al. .......... 180/292 |
| 2002/0003051 A1 * | 1/2002 | Ishii et al. ................. 180/53.6 |
| 2002/0014358 A1 * | 2/2002 | Osuga et al. .............. 180/53.6 |
| 2003/0062212 A1 | 4/2003 | Kazuo et al. |

FOREIGN PATENT DOCUMENTS

| DE | 198 03 547 A1 | 8/1998 |
| EP | 0 569 250 A | 11/1993 |
| EP | 0 987 137 A | 3/2000 |
| JP | 56-77437 | 6/1981 |

OTHER PUBLICATIONS

Partial European Search Report dated Feb. 28, 2006, pp. 1-4 for European Patent Application No. 04007563.

* cited by examiner

*Primary Examiner*—Ruth Ilan
(74) *Attorney, Agent, or Firm*—Sterne, Kessler, Goldstein & Fox P.L.L.C.

(57) ABSTRACT

A power-dividing device for a working vehicle includes a case member, an input shaft supported by the case member so that a first end portion of the input shaft can be operatively connected to a driving source, a PTO unit having a PTO shaft supported by the case member so as to be offset with respect to the input shaft, a power transmission mechanism accommodated in the case member to transmit power from the input shaft to the PTO shaft, and a first pump unit having a first pump shaft operatively connected to the input shaft and being fluid-connected to an actuator disposed outside.

11 Claims, 20 Drawing Sheets

(a)

(b)

POWER-DIVIDING DEVICE AND AXLE-DRIVING DEVICE FOR A WORKING VEHICLE

BACKGROUND OF THE INVENTION

1. Field of the Invention

The present invention relates to a power-dividing device of a working vehicle that is formed to be able to divide or split a driving power input from a driving source into at least two routes.

The invention also relates to an axle-driving device for independently driving drive wheels with motor units provided for the respective drive axles.

2. Related Art

Conventionally, various power transmission structures in working vehicles have been proposed and employed. For example, there is a conventionally known structure in a working vehicle including a pump unit operatively connected to a driving source and a driven-side actuator fluid-connected to the pump unit, in which the actuator is disposed at a distance from the hydraulic pump.

In this structure, the hydraulic pump unit forms a main power transmission path for changing a speed of and outputting a driving power from the driving source together with the actuator.

Depending on uses, an auxiliary power transmission path may be required in some cases in addition to the main power transmission path in the power transmission structure including the hydraulic pump unit and the actuator disposed at a distance from each other. An example of these cases is a lawn mower in which power from a common driving source is divided or split and output into a traveling power transmission path for driving drive wheels and a PTO power transmission path for driving a work machine such as a mower.

Cases using a hydraulic motor unit as the actuator will be described below as examples.

There are disclosed, in U.S. Pat. No. 4,395,865 (hereafter, referred to as a cited reference 1) and U.S. Pat. No. 5,809,756 (hereafter, referred to as a cited reference 2), lawn mowers each including a PTO power transmission path for transmitting power from an engine to a mower in addition to a traveling power transmission path formed of a hydraulic pump unit operatively connected to the engine and a hydraulic motor unit disposed at a distance from the hydraulic pump unit to drive drive wheels.

More specifically, in the lawn mower described in the cited reference 1, first and second output shafts are provided to the engine as a common driving source and are operatively connected to the hydraulic pump unit and the mower, respectively. In other words, in the lawn mower described in the cited reference 1, the traveling power transmission path and the PTO power transmission path are completely separate from each other.

However, because the traveling power transmission path and the PTO power transmission path are completely separate from each other in this structure, the number of parts forming the power transmission paths increases and, also, large space for accommodating both the power transmission paths is required.

Moreover, in such a power transmission structure having the two power transmission paths, power transmission/interruption in each power transmission path needs to be independently controlled.

In this regard, electromagnetic clutches for power transmission/interruption are inserted into the respective power transmission paths in the lawn mower described in the cited reference 1, but there is a problem in that the electromagnetic clutches are of poor durability and, as a result, impair reliability of the power transmission paths.

On the other hand, in the lawn mower described in the cited reference 2, a common output shaft is provided to the engine and a pulley for the drive wheels and a pulley for the mower are supported on the common output shaft to thereby divide or split power from the common output shaft into the traveling power transmission path and the PTO power transmission path.

In this structure, however, there is a problem in that the common output shaft has to be made long and a large load is applied to the common output shaft.

Further, there is no description of how to transmit/interrupt power in the respective power transmission paths in the cited reference 2.

There are also conventionally known axle-driving devices in each of which a motor unit forming a non-stepwisely changeable transmission such as a hydrostatic transmission (hereafter, referred to as a HST) in cooperation with a drive-side actuator is provided to each a drive axle.

The conventional axle-driving devices will be described by taking cases, as examples, each using a hydraulic pump unit as the drive-side actuator and a hydraulic motor unit fluid-connected to the hydraulic pump unit as the motor unit.

Each of the axle-driving devices described in U.S. Pat. No. 4,920,733 (hereafter, referred as cited reference 3) and Japanese Utility Model Unexamined Publication No. 56-77437 (hereafter, referred as a cited reference 4) has an advantage that a cornering ability and, especially, an ability to make a small turn of a vehicle can be improved because the respective drive axles can be independently driven at changeable speeds. However, they are susceptible to improvement with regard to miniaturization of the whole units.

Especially, it is preferable to provide a brake unit to each drive axle so as to enable the vehicle to make a smaller turn. However, neither of the cited references mentions the brake unit and, of course, there is no description of miniaturization of the whole unit including the brake unit.

The present invention has been accomplished in view of the above related art, and it is an object of the invention to provide a power-dividing device of a working vehicle, that is capable of dividing or splitting a driving power input from a driving source into a main power transmission path including a pump unit and an auxiliary power transmission path including a PTO unit with a simple structure.

The present invention has been accomplished in view of the above related art, and it is another object of the invention to miniaturize a whole unit in the axle-driving device having a motor unit and a brake unit for each drive axle.

It is still another object of the invention to secure large and free space between drive wheels without increasing a distance between the drive wheels in a vehicle including the axle-driving device having the motor unit and the brake unit for each drive axle.

SUMMARY OF THE INVENTION

According to one aspect of the present invention, there is provided a power-dividing device for a working vehicle that includes a case member, an input shaft supported by the case member so that a first end portion of the input shaft can be operatively connected to a driving source, a PTO unit having a PTO shaft supported by the case member so as to be offset with respect to the input shaft, a power transmission mechanism accommodated in the case member to transmit power from the input shaft to the PTO shaft, and a first pump unit having a first pump shaft operatively connected to the input shaft and being fluid-connected to an actuator disposed outside.

With this structure, the driving power from the driving source can easily be divided or split into a main power transmission path including the pump shaft and an auxiliary power transmission path including the PTO shaft.

Especially, when the output from the PTO shaft is transmitted to the ground work machine, it is possible to suppress a vertical distance between the PTO shaft and the input portion of the ground work machine while suppressing a vertical distance between the output portion of the driving source and the input shaft. It is therefore possible to carry out power transmission between the driving source and the input shaft and between the PTO shaft and the ground work machine without laboring.

For example, the first pump shaft may be operatively connected to the input shaft through the power transmission mechanism.

Furthermore, the first pump shaft may be disposed between the input shaft and the PTO shaft in a vertical direction In one embodiment, the power-dividing device further include a second pump unit which has a second pump shaft operatively connected to the input shaft and which is fluid-connected to the actuator disposed outside.

In the one embodiment, for example, the second pump shaft is operatively connected to the input shaft through the power transmission mechanism.

Preferably, the first and second pump units are formed of the same components.

With this structure, it is possible to use general-purpose products as the first and second pump units.

In the one embodiment, the input shaft is disposed along a vehicle back and forth direction, and the first pump unit and the second pump unit may be coupled to the same side of the case member in the vehicle back and forth direction.

Alternatively, the first pump unit and the second pump unit may be coupled to a first side and a second side of the case member in the vehicle back and forth direction, respectively.

With this structure, it is possible to effectively utilize an idle space in the vicinity of the case member.

In the alternative structure, preferably, the first and second pump shafts are disposed coaxially.

In the one embodiment, for example, the first and second pump units respectively may include first and second pump cases coupled to the case member, first and second pump main bodies accommodated in the first and second pump cases, and first and second center sections supporting the first and second pump main bodies. Each of the first and second pump cases includes a proximal end wall having a through hole through which the corresponding pump shaft is inserted and a peripheral wall extending in an axial direction of the corresponding pump shaft from a peripheral edge portion of the proximal end wall and having an opening on a free end side. The proximal end wall is coupled to the case member. Each of the first and second pump main bodies is driven by the corresponding pump shaft and is accommodated into the corresponding pump case from the opening on the free end side of the corresponding pump case. The first and second center sections are coupled to the first and second pump cases, respectively, so as to close the opening on the free end sides of the first and second pump cases.

Furthermore, the working vehicle may include a pair of left and right drive wheels and a ground work machine. In that case, for example, the power-dividing device is disposed between the driving source and the ground work machine in the vehicle back and forth direction. The input shaft is operatively connected to an output portion of the driving source. The PTO shaft is operatively connected to the ground work machine. The first and second pump units are fluid-connected to a pair of left and right hydraulic motor units and for driving the pair of drive wheels, respectively In the one embodiment, preferably, the power-dividing device further has a charge pump unit operatively connected to the input shaft.

With this structure, it is possible to efficiently obtain hydraulic fluid for various hydraulic devices.

Preferably, the PTO unit further includes a PTO clutch mechanism for selectively engaging/interrupting power transmission from the input shaft to the PTO shaft.

More preferably, the PTO unit further includes a PTO brake mechanism for releasing/applying a braking force from and to the PTO shaft in synchronization with an operation for transmitting/interrupting power from the input shaft to the PTO shaft by the PTO clutch mechanism.

For example, a part of pressure oil from the charge pump unit operatively driven by the input shaft is supplied to the PTO clutch mechanism and/or the PTO brake mechanism as hydraulic fluid.

In any one of the above embodiments, the input shaft and the PTO shaft are, for example, along the vehicle back and forth direction and are disposed substantially in the same position in a vehicle width direction.

According to one aspect of the present invention, there is further provided a power-dividing device that includes a case member, an input shaft supported by the case member so that a first end portion of the input shaft can be operatively connected to a driving source, a PTO shaft supported by the case member so as to be offset with respect to the input shaft, a power transmission mechanism accommodated in the case member to transmit power from the input shaft to the PTO shaft, a first pump shaft operatively connected to the input shaft, and a first pump unit main body accommodated in the case member, driven by said first pump shaft and fluid-connected to an actuator disposed outside.

According to another aspect of the present invention, there is provided an axle-driving device that has an axle case including an outer wall supporting a drive axle in a rotatable manner about its axis and an inner wall separated inward in a vehicle width direction from the outer wall so that an inner end portion of the drive axle in the vehicle width direction is positioned between the outer wall and the inner wall, a motor unit forming a non-stepwisely changeable transmission in cooperation with an actuator disposed at a distance and including a motor shaft supported by the inner wall in a rotatable manner about its axis so that an outer end portion of the motor shaft in the vehicle width direction is positioned in a accommodating space in said axle case and a motor main body supported by said inner wall, a reduction power transmission unit including an output gear supported on the outer end portion of the motor shaft in the vehicle width direction so as to be non-rotatable with respect to the motor shaft, a final gear supported on the inner end portion of the drive axle in the vehicle width direction so as to be non-rotatable with respect to the drive axle and a gear train for reducing a speed of and transmitting power from said output gear to said final gear and including an intermediate shaft supported by the axle case so as to be positioned above the motor shaft, and a brake unit for selectively applying a braking force to the intermediate shaft based on operation from outside. The motor unit is disposed so that at least a portion of the motor unit overlaps with the final gear when viewed along an axial direction of the drive axle. The brake unit is supported by the inner wall of the axle case so as to be positioned above the motor unit.

With this structure, it is possible to make the unit itself compact.

Especially, a size of a free space between the drive wheels can be increased without increasing a distance between the drive wheels as compared with a structure in that the motor unit and the brake unit are arranged in parallel with each other in the vehicle width direction. It is therefore possible to effectively prevent interference with other members such as a center discharge duct which can be provided in a bottom portion of the vehicle.

Preferably, the brake unit is disposed so that at least a portion of the brake unit overlaps with the hydraulic motor unit in plan view.

More preferably, the axle-driving device further includes a mounting stay having a proximal end portion coupled to a body frame and a distal end portion supporting the axle case.

In this embodiment, the mounting stay is formed so as to define a surrounded space in which the motor unit is positioned and at least an upper side of which is open between the inner wall of said axle case and the body frame the brake unit includes a rotary member supported on the intermediate shaft in a non-rotatable manner, a fixed member supported by the axle case, a friction braking device which has a pair of friction discs respectively supported by the rotary member and the fixed member in a non-rotatable manner and which selectively applies a braking force to the rotary member based on operation from outside, and an operating arm for operating the friction braking device by swinging about a pivot axis disposed in parallel to the intermediate shaft. The operating arm can be operated from the upper opening of the surrounded space.

With this structure, it is possible to easily gain access to the operating arm in the brake unit through the upper opening. It is therefore possible to simplify the linkage interlocked with and linked to the operating arm.

More preferably, the motor unit is formed so that a connection portion to the actuator is oriented upward at a position between the operating arm of the brake unit and the body frame.

With this structure it is possible to simplify the connection member for connection between the motor unit and the actuator.

For example, the actuator is a hydraulic pump unit. The motor unit is a hydraulic motor unit fluid-connected to the hydraulic pump unit through a flow path so as to form an HST in cooperation with the hydraulic pump unit. The hydraulic motor unit has a center section formed with an oil path which forms a portion of the flow path and a first end portion of which forms the connection portion to the actuator.

According to another aspect of the present invention, there is further provided an vehicle that has a body frame including a pair of main frames disposed along a vehicle back and forth direction, an engine supported on the body frame, a power-dividing device including a pair of hydraulic pump units operatively connected to an output portion of the engine, a pair of drive axles, and a pair of axle-driving devices respectively and independently driving the pair of drive axles.

In the vehicle of the present invention, each of the pair of axle-driving devices includes an axle case, a hydraulic motor unit, a reduction power transmission unit and a brake unit.

The axle case has an outer wall supporting the corresponding drive axle in a rotatable manner and an inner wall separated inward in a vehicle width direction from the outer wall so that an inner end portion of the drive axle in the vehicle width direction is positioned between the outer wall and the inner wall. The axle case is supported by the corresponding main frame.

The hydraulic motor unit is fluid-connected to the corresponding hydraulic pump unit through a flow path so as to form an HST. The hydraulic motor unit includes a motor shaft supported by the inner wall in a rotatable manner so that an outer end portion of the motor shaft in the vehicle width direction is positioned in an accommodating space in the axle case and a motor main body supported by the inner wall.

The vehicle of the present invention further has a reduction power transmission unit that includes an output gear supported on an outer end portion of the motor shaft in the vehicle width direction in a non-rotatable manner, a final gear supported on an inner end portion of the drive axle in the vehicle width direction in a non-rotatable manner, and a gear train for reducing a speed of and transmitting power from the output gear to the final gear. The gear train included an intermediate shaft supported by the axle case so as to be positioned above said motor shaft.

The brake unit is formed to selectively apply a braking force to the intermediate shaft based on operation from outside.

The hydraulic motor unit is disposed so that at least a portion of the motor unit overlaps with the final gear when viewed along an axial direction of said drive axle.

The brake unit is supported by the inner wall of the axle case so as to be positioned above the hydraulic motor unit.

Preferably, each of the pair of axle-driving devices further includes a mounting stay having a proximal end portion coupled to the corresponding main frame and a distal end portion supporting the axle case. The mounting stay is formed so as to define a surrounded space in which the hydraulic motor unit is positioned and at least an upper side of which is open between the inner wall of the axle case and the corresponding main frame. The brake unit includes a rotary member supported on the intermediate shaft in a non-rotatable manner, a fixed member supported by the axle case, a friction braking device which has friction discs respectively supported by the rotary member and the fixed member in a non-rotatable manner and which selectively applies a braking force to the rotary member based on operation from outside, and an operating arm for operating the friction braking device by swinging about a pivot axis disposed in parallel to the intermediate shaft. The operating arm can be operated from the upper opening of the surrounded space.

More preferably, the hydraulic motor unit has a center section formed with an oil path forming a portion of the flow path between the hydraulic pump unit and the hydraulic motor unit. The oil path opens upward at a position between the operating arm in the brake unit and the main frame.

BRIEF DESCRIPTION OF THE DRAWINGS

The above, and other objects, features and advantages of the present invention will become apparent from the detailed description thereof in conjunction with the accompanying drawings wherein.

DETAILED DESCRIPTION OF THE PREFERRED EMBODIMENTS

Embodiment 1

A preferred embodiment of a power-dividing device according to one aspect of the present invention will be described below with reference to the accompanying drawings.

A power-dividing device 1A according to one aspect of the invention is formed to be able to divide or split and output a driving power from a driving source 150 into a main power transmission path including pump units and driven actuators fluid-connected to each other and an auxiliary power transmission path including a PTO unit.

In this embodiment, a case using first and second hydraulic motor units formed to be able to respectively drive a pair of drive wheels as the driven actuators will be described as an example.

Figure 1:
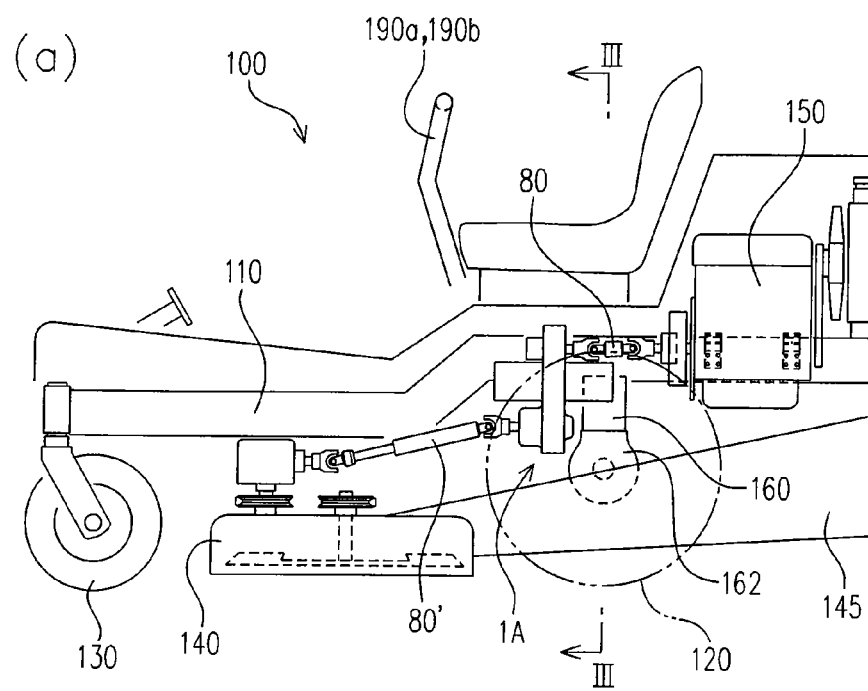
FIGS. 1(a) and 1(b) are respectively a side view and a plan view of a lawn mower, to which a power-dividing device according to one embodiment of the present invention has been applied.
Figure 1:
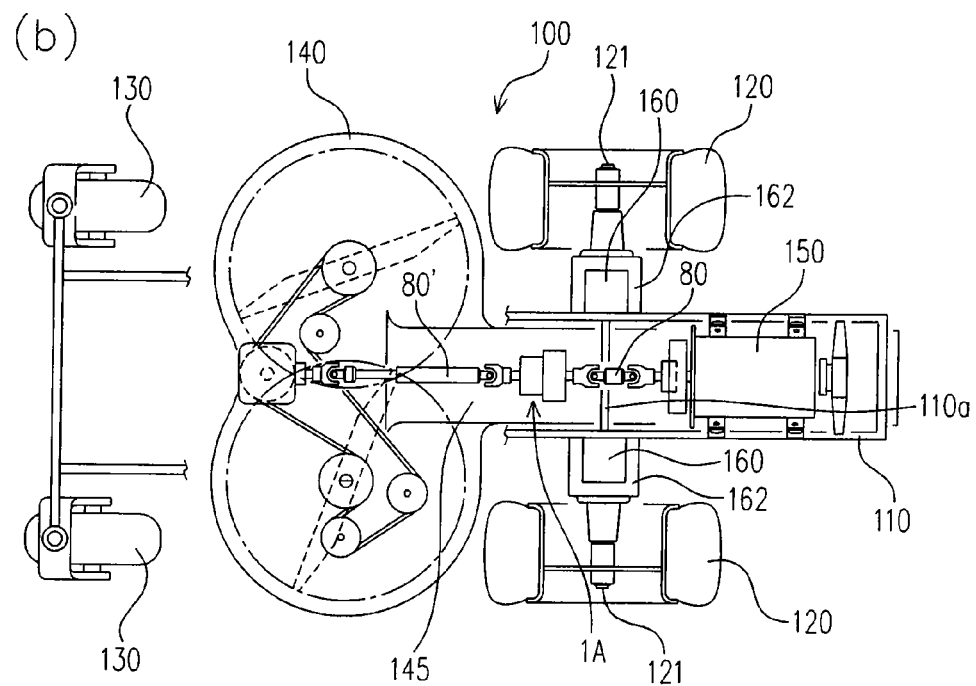
Figure 2:
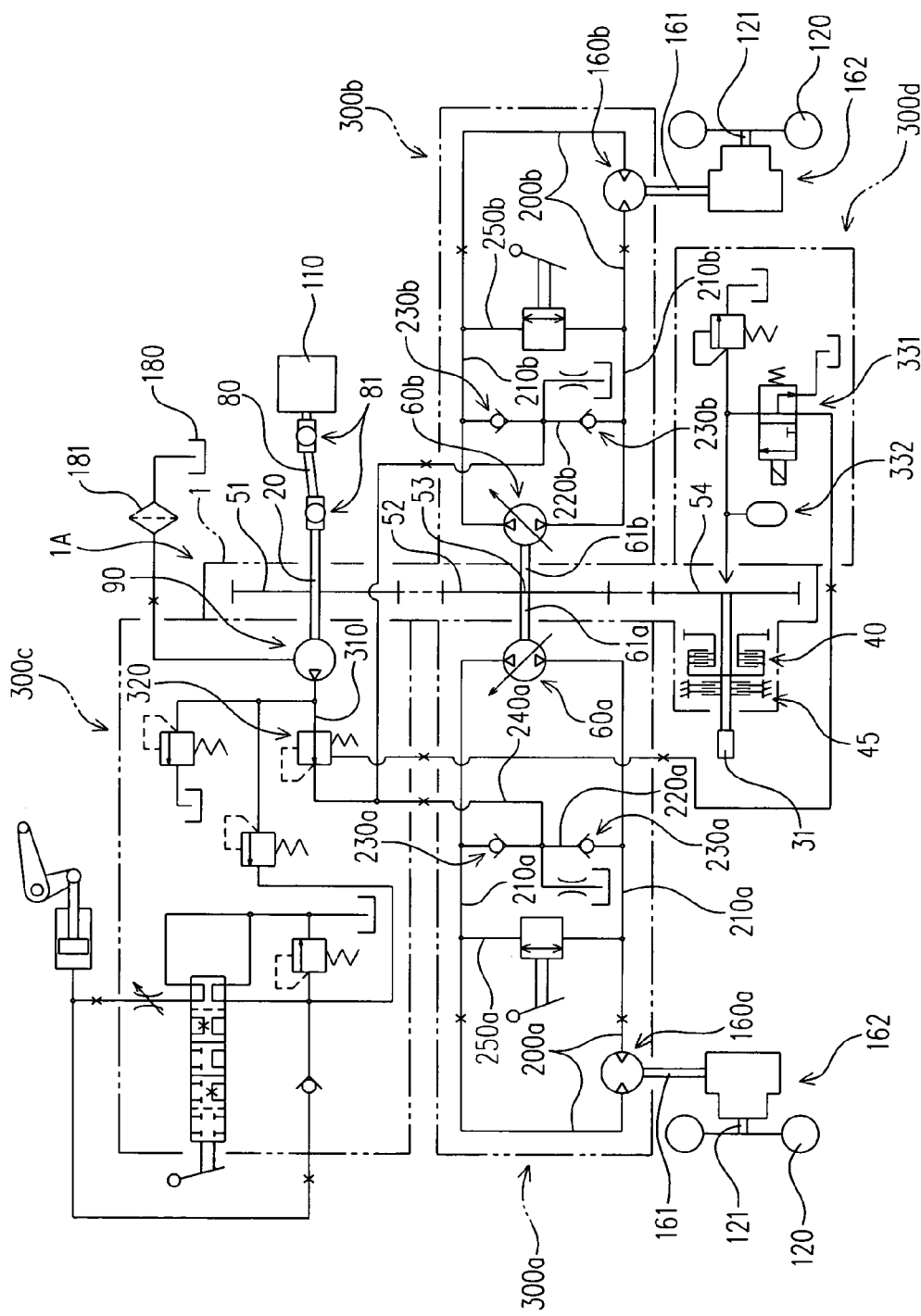
FIG. 2 is an oil hydraulic circuit diagram of the lawn mower shown in FIG. 1.
Figure 3:
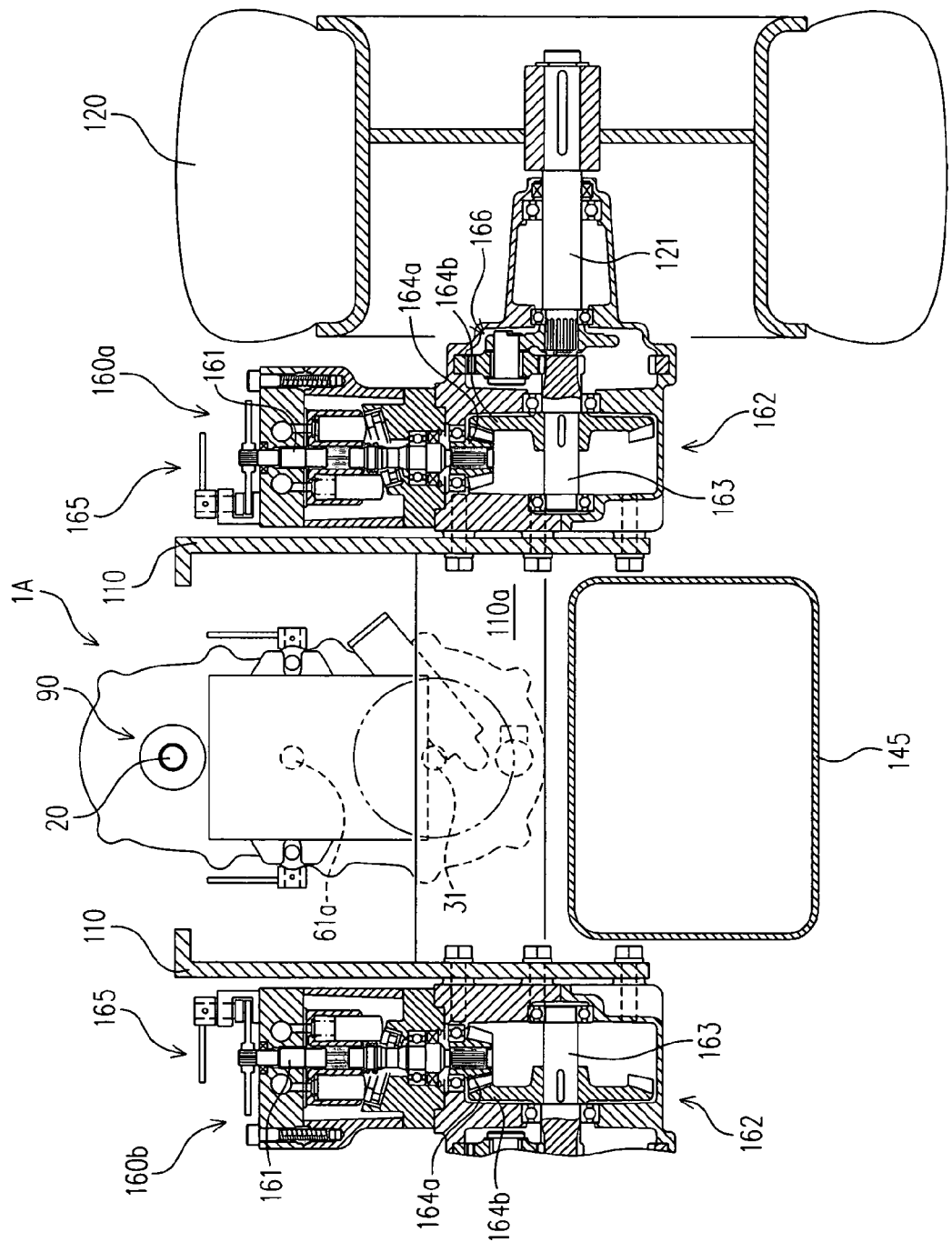
FIG. 3 is a sectional view taken along line III-III in FIG. 1(a).

FIGS. 1(a) and 1(b) are a side view and a plan view of a lawn mower 100 to which the power-dividing device 1A according to this embodiment is applied. FIG. 2 is an oil hydraulic circuit diagram of the lawn mower 100. FIG. 3 is a sectional view taken along line III-III in FIG. 1(a).

First, the lawn mower 100 will be described.

As shown in FIGS. 1(a) and 1(b), the lawn mower 100 includes a body frame 110, a pair of left and right drive wheels (rear wheels in this embodiment) 120 supported on the body frame 110, casters 130 supported on the body frame 110 so as to be disposed on one side (front side in this embodiment) in a back and forth direction of the vehicle with respect to the drive wheels 120, a ground work machine (mower in this embodiment) 140 supported by the body frame 110 so as to be positioned between the drive wheels 120 and the casters 130, a driving source 150 supported on the body frame 110 so as to be positioned on an opposite side (rear side in this embodiment) of the drive wheels 120 to the ground work machine 140 along the back and forth direction of the vehicle, first and second hydraulic motor units 160a and 160b having motor shafts 161 operatively connected to the pair of left and right drive wheels 120, respectively, and the power-dividing device 1A according to this embodiment.

A reference numeral 145 in FIG. 3 denotes a rear discharge duct forming a discharge path from the mower 140. A reference numeral 110a in FIGS. 1(b) and 3 denotes a cross member for reinforcement that is laid across and fixed to a pair of left and right main frames forming the body frame 110 by welding.

Reference numerals 165 in FIGS. 2 and 3 denote braking devices for applying braking forces to the motor shafts of the first and second hydraulic motor units, respectively.

Figure 4:
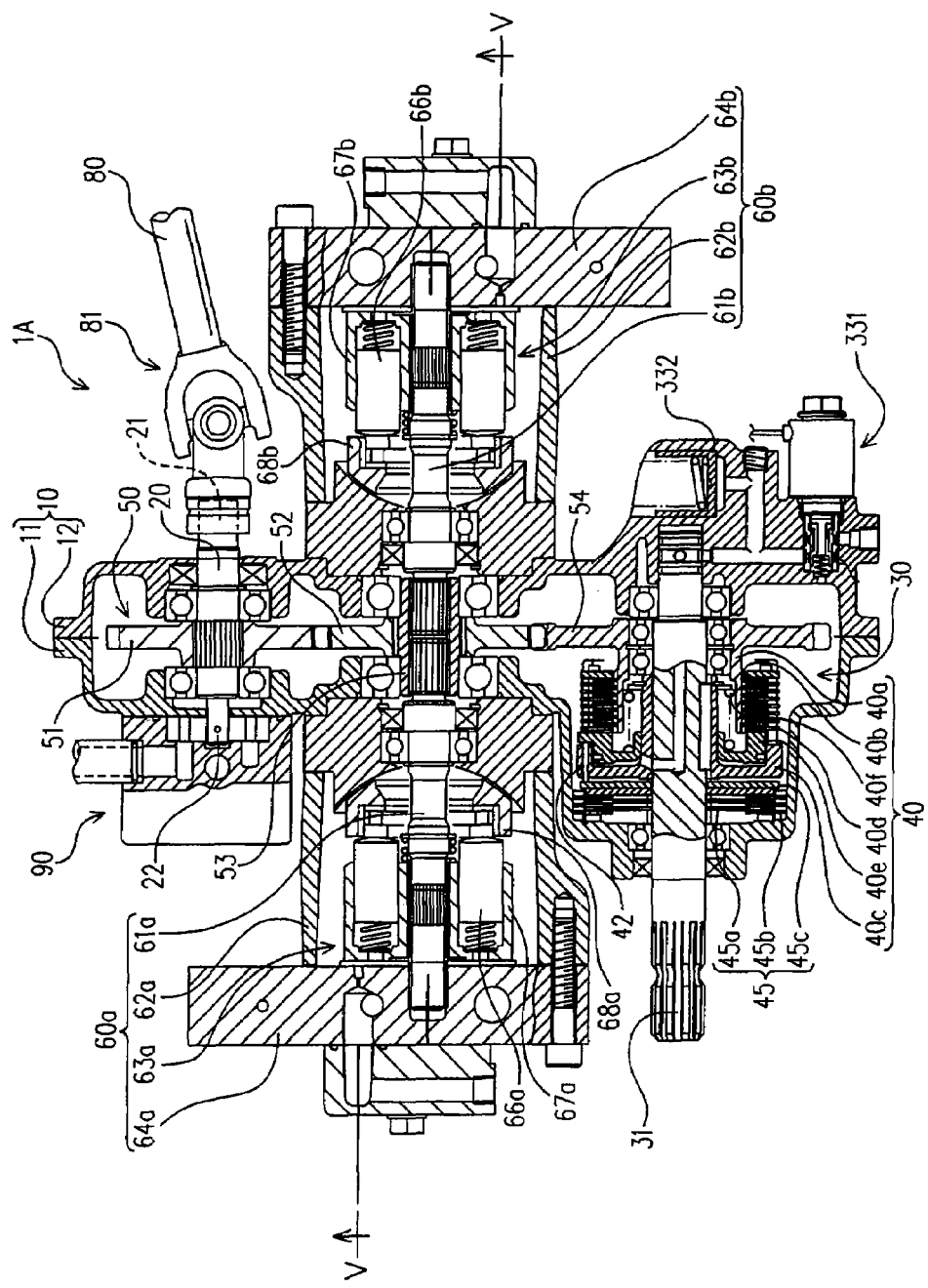
FIG. 4 is a vertical sectional side view of the power-dividing device shown in FIG. 1.
Figure 5:
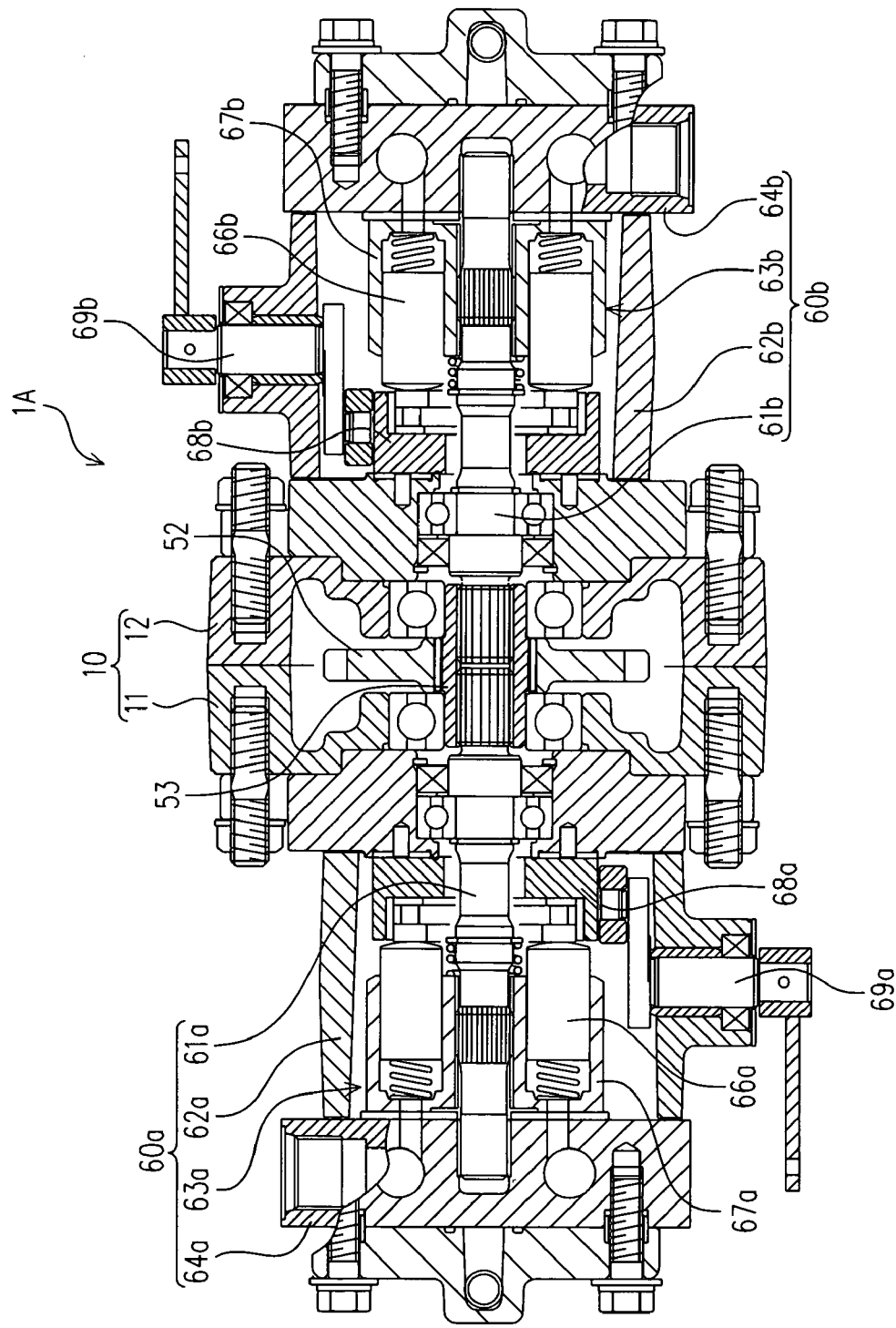
FIG. 5 is a horizontal sectional plan view of the power-dividing device shown in FIG. 4.

FIGS. 4 and 5 are a vertical sectional side view and a horizontal sectional plan view of the power-dividing device 1A according to this embodiment, respectively.

As shown in FIGS. 4 and 5, the power-dividing device 1A includes a case member 10, an input shaft 20 supported by the case member 10, a PTO unit 30 accommodated in the case member 10, and a power transmission mechanism 50 housed in the case member 10 to transmit power from the input shaft 20 to the PTO shaft 30, a first pump unit 60a supported by the case member 10, and a second pump unit 60b supported by the case member 10.

As shown in FIGS. 4 and 5, in this embodiment, the case member 10 can be divided into a first case member 11 and a second case member 12 respectively on a first side and a second side in the back and forth direction of the vehicle.

The input shaft 20 is supported by the case member 10 in such a manner that its first end portion 21 (rear end portion in this embodiment) is operatively connected to the driving source 150.

It is preferable that the input shaft 20 is supported on the case member 10 to be positioned substantially in the same position in a vertical direction as an output portion of the driving source 150 (see FIG. 1(a)).

It is more preferable that the input shaft 20 is positioned substantially in the same position in a vehicle width direction as the output portion of the driving source 150 (see FIG. 1(b)).

With this structure, it is possible to readily couple the output portion of the driving source 150 and the input shaft 20 to each other.

In this embodiment, the driving source 150 is supported in a vibration-preventing manner with respect to the body frame 110 and the case member 10 is fixedly supported on the body frame 110.

Therefore, in order to absorb a vibration difference between the input shaft 20 and the driving source 150, the input shaft 20 and the output portion of the driving source 150 are coupled to each other through vibration absorbing power transmission means. In this embodiment, a power transmission shaft 80 mounted at opposite end portions thereof with universal joints 81 is used as the vibration absorbing power transmission means.

Although the case member 10 is fixedly supported on the body frame 110 in the state where the case member 10 is disposed at a distance from the driving source 150 supported on the body frame 110 in a vibration-preventing manner in this embodiment, instead, it is also possible to couple and support the case member 10 onto the driving source 150 in the state where the case member 10 is freely from the body frame 110.

With this structure, it is possible to eliminate the vibration difference between the driving source 150 and the case member 10.

In this embodiment, the input shaft 20 is supported on the case member 10 along the back and forth direction of the vehicle and a second end portion 22 (front end portion in this embodiment) of the input shaft 20 positioned on an axial opposite side to the first end portion 21 also extends outside from the case member 10 in addition to the first end portion 21 operatively connected with the driving source 150 (see FIG. 4).

A charge pump unit 90 is drivably supported on the second end portion 22 of the input shaft 20.

The charge pump unit 90 supplies pressure oil to various oil hydraulic circuits as described later.

Although the charge pump 90 is a trochoid pump in this embodiment, it may be an external gear pump when high pressure or a large displacement is required.

The PTO unit 30 has a PTO shaft 31. The PTO shaft 31 is supported by the case member 10 at a position below the input shaft 20.

The PTO shaft 31 is supported by the case member 10 in such a manner that a proximal end portion (rear end portion in this embodiment) of the PTO shaft 31 is positioned in the case member 10 and that a free end portion (front end portion in this embodiment) of the PTO shaft 31 extends outside from the case member 10.

In this embodiment, the portion of the PTO shaft 31 extending outside is operatively connected to an input portion of the mower 140 through the vibration absorbing power transmission means 80' (see FIGS. 1(a) and 1(b)).

The power transmission mechanism 50 is formed to transmit the driving power from the input shaft 20 to the PTO shaft 31 as described above.

In this embodiment, the power transmission mechanism 50 includes a drive-side gear 51 supported on the input shaft 20 so as to be non-rotatable with respect to the input shaft 20, a counter gear 52 engaged with the drive-side gear 51, a counter shaft 53 for supporting the counter gear 52, a driven-side gear 54 engaged with the counter gear 52 and formed to be able to transmit rotating power to the PTO shaft 31.

Figure 6:
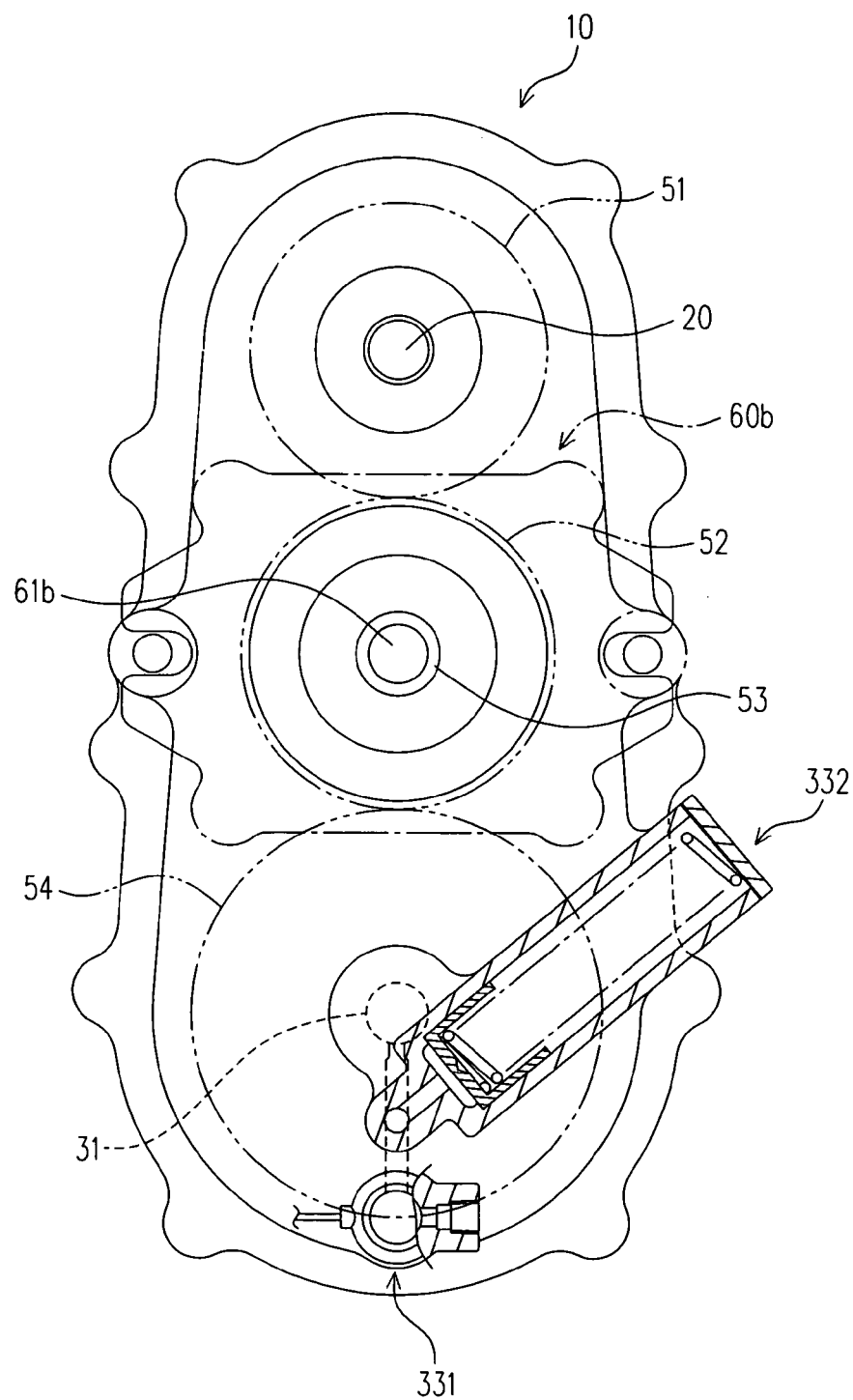
FIG. 6 is a back view of the power-dividing device shown in FIGS. 4 and 5 with some part of them shown in vertical section.

FIG. 6 is a vertical sectional back view of the power-dividing device 1A.

As shown in FIG. 6, in this embodiment, the input shaft 20 and the PTO shaft 31 are positioned substantially in the same position in the vehicle width direction and the counter shaft 53 is positioned substantially in the same position as the input shaft 20 and the PTO shaft 31 in the vehicle width direction. With this structure, a vertical distance between the input shaft 20 and the PTO shaft 31 could be maximized and a length of the power-dividing device 1A in the vehicle width direction could be minimized.

It is more preferable that the PTO unit 30 has a PTO clutch mechanism 40 for selectively engaging/interrupting power transmission between the driven-side gear 54 and the PTO shaft 31.

In other words, the driven-side gear 54 may be formed to be rotatable with respect to the PTO shaft 31 and the PTO clutch mechanism 40 may be provided between the driven-side gear 54 and the PTO shaft 31.

Specifically, the PTO clutch mechanism 40 includes a drive-side member 40a which is supported on the PTO shaft 31 so as to be rotatable and axially non-slidable with respect to the PTO shaft 31 and which rotates integrally with the driven-side gear 54, a drive-side friction disc 40b supported on the drive-side member 40a so as to be non-rotatable and axially slidable with respect to the member 40a, a driven-side member 40c supported on the PTO shaft 31 so as to be non-rotatable with respect to the PTO shaft 31, a driven-side friction disc 40d supported on the driven-side member 40c so as to be non-rotatable and axially slidable in a certain range with respect to the driven-side member 40, a clutch actuating member 40e for bringing the driven-side friction disc 40d and the drive-side friction disc 40b into frictional engagement with each other by receiving hydraulic pressure, and a clutch biasing member 40f for separating the clutch actuating member 40e from the drive-side friction disc 40b and the driven-side friction disc 40d.

By forming the PTO clutch mechanism 40 such that power can be interrupted between "the drive-side member 40a rotatable integrally with the driven-side gear 54 and supported on the PTO shaft 31 so as to be rotatable with respect to the PTO shaft 31" and "the PTO shaft 31" as described above, it is possible to interrupt power transmission from the input shaft 20 to the PTO shaft 31 while maintaining power transmission from the input shaft 20 to first and second pump shafts 61a and 61b which will be described later.

The PTO clutch mechanism 40 with such a structure transmits power from the input shaft 20 to the PTO shaft 31 through the drive-side member 40a and the driven-side member 40c when the clutch actuating member 40e brings both the friction discs 40b and 40d into frictional engagement with each other by the action of hydraulic fluid pressure, and interrupts transmission of power from the input shaft 20 to the PTO shaft 31 when the action of the hydraulic pressure is not received.

As hydraulic fluid to the PTO clutch mechanism, the pressure oil from the charge pump can be utilized (see FIG. 2).

It is more preferable that the PTO unit 30 includes a PTO brake mechanism 45 for operating in conjunction with clutch operation of the PTO clutch mechanism 40. Thus, it is possible to effectively prevent the PTO shaft 31 from continuously rotating due to an inertial force of the connected ground work machine 140 even when the PTO clutch mechanism 40 interrupts power transmission.

The PTO brake mechanism 45 includes a brake disc 45a supported on the PTO shaft 31 so as to be non-rotatable and axially slidable with respect to the PTO shaft 31, a fixed disc 45b facing the brake disc 45a so as to be non-rotatable and axially slidable, and a brake actuating member 45c operatively connected to the clutch actuating member 40e through an connecting member 42.

The brake actuating member 45c is operatively connected to the clutch actuating member 40e in such a manner as to bring the brake disc 45a and the fixed disc 45b into frictional engagement with each other when the clutch actuating member 40e is separated from the drive-side friction disc 40b and the driven-side friction disc 40d by a biasing force of the clutch biasing member 40f and in such a manner as to move away from the brake disc 45a and the fixed disc 45b when the clutch actuating member 40e receives the action of hydraulic pressure to bring the drive-side friction disc 40b and the driven-side friction disc 40d into frictional engagement with each other against the biasing force of the clutch biasing member 40f.

As shown in FIG. 2, the first and second pump units 60a and 60b are respectively fluid-connected to the first hydraulic motor unit 160a and the second hydraulic motor unit 160b through oil hydraulic circuits (a pair of hydraulic lines 200a and a pair of hydraulic lines 200b in this embodiment).

In other words, in this embodiment, the first pump unit 60a and the first hydraulic motor unit 160a form a first HST and the second pump unit 60b and the second hydraulic motor unit 160b form a second HST.

Although the power-dividing device 1A according to this embodiment includes the first and second pump units 60a and 60b corresponding to the pair of left and right hydraulic motor units 160a and 160b, respectively, so as to be able to drive the pair of drive wheels 120 of the lawn mower 100 at independent rotation speeds of each other, the invention is not limited to this form but also includes a form having only one pump unit and a form having three or more pump units.

For example, if only one pump unit is provided, the single pump unit is fluid-connected to the pair of left and right hydraulic motor units 160a and 160b through oil hydraulic circuits having fluid distributing means such as a flow diverter valve.

At least one of the first pump unit 60a and the first hydraulic motor unit 160a forming the first HST and at least one of the second pump unit 60b and the second hydraulic motor unit 160b forming the second HST are of a variable displacement type in which a suction/discharge rate is changed by operation of an output adjusting member, and non-stepwisely changeable outputs are obtained from motor shafts of the hydraulic motor units 160a and 160b by controlling a slanting position of the output adjusting member. In this embodiment, the first and second pump units 60a and 60b are of the variable displacement type and the first and second hydraulic motor units 160a and 160b are of a fixed displacement type.

Specifically, the first and second pump unit 60a and 60b respectively include first and second pump shafts 61a and 61b operatively connected to the input shaft 20, first and second pump cases 62a and 62b coupled to the case member 10, first and second pump main bodies 63a and 63b driven by the first and second pump shafts 61a and 61b, and first and second center sections 64a and 64b supporting the first and second pump main bodies 63a and 63b.

In this embodiment, the first and second pump units 60a and 60b are coupled to a first side and a second other side of the case member 10 in the back and forth direction of the vehicle.

Specifically, the first pump unit 60a is coupled to the first side (front side in this embodiment) of the case member 10 in the back and forth direction of the vehicle so as to be positioned above the PTO shaft 31.

On the other hand, the second pump unit 60b is coupled to the second side (rear side in this embodiment) of the case member 10 in the back and forth direction of the vehicle so as to be positioned below the first end portion (rear end portion in this embodiment) of the input shaft 20.

By separately disposing the first and second pump units 60a and 60b on the front and rear sides of the case member 10 along the vehicle back and forth direction, it is possible to make effective use of idle spaces in the vicinity of the input shaft 20 and the PTO shaft 31 to thereby suppress upsizing of the whole power-dividing device.

The first and second pump shafts 61a and 61b are supported by the case member 10 along the back and forth direction of the vehicle, respectively, in such a manner that proximal end portions of the first and second pump shafts 61a and 61b are operatively connected to the input shaft 20 in the case member 10 and free end portions (or distal end portions) thereof are positioned outside of the case member 10.

Specifically, the counter shaft 53 of the power transmission mechanism 50 is not rotatable with respect to the counter gear 52 and is a hollow shaft having an axial hole provided with a spline on an inner peripheral face of the hole.

The first and second pump shafts 61a and 61b are disposed coaxially with the counter shaft 53, and the respective proximal end portions of the first and second pump shafts 61a and 61b are coupled to the spline formed on the inner surface of the counter shaft 53.

By coaxially disposing the first and second pump shafts 61a and 61b, it is possible to efficiently transmit power from the input shaft 20 to the first and second pump shafts 61a and 61b.

The first and second pump cases 62a and 62b respectively include proximal end walls having through holes through which the first and second pump shafts 61a and 61b are inserted, and peripheral walls extending in the axial direction of the first and second pump shafts from peripheral edge portions of the proximal end walls so as to have an opening on free end sides. The proximal end walls are coupled to the case member 10.

The first and second pump main bodies 63a and 63b respectively include piston units 66a and 66b which rotate about axes of the corresponding pump shafts and reciprocate along the axes as the first and second pump shafts 61a and 61b rotate about the axes, cylinder blocks 67a and 67b which accommodate the piston units 66a and 66b in an axially slidable manner and which rotate with the piston units 66a and 66b about the axes of the corresponding pump shafts, output adjusting members 68a and 68b which determine stroke lengths of the piston units 66a and 66b according to slanting positions to change suction/discharge rate by the piston units 66a and 66b, and control shafts 69a and 69b coupled with the output adjusting members 68a and 68b so as to be able to control the slanting positions of the output adjusting members 68a and 68b from outside.

Although the hydraulic pump main bodies 63a and 63b are of an axial-piston type in this embodiment, it is needless to say that they may be of a radial-piston type.

As described above, in the power-dividing device 1A according to this embodiment, the first and second pump units 60a and 60b are formed of the same members and are coupled to the case member 10.

Therefore, common general-purpose products can be used as the first and second pump units 60a and 60b to thereby reduce the cost in production.

It is preferable that the first and second hydraulic pump main bodies 63a and 63b are coupled to the case member 10 so that the control shafts 69a and 69b of the respective main bodies 63a and 63b extend on a first side and a second side in the vehicle width direction.

With this structure, the respective control shafts 69a and 69b of the first and second hydraulic pump main bodies 63a and 63b can be readily connected to left and right operating levers 190a and 190b (FIG. 1(a)) disposed in the vicinity of a driver's seat, respectively.

The first and second center sections 64a and 64b are coupled to the first and second pump cases 62a and 62b, respectively, so as to close the free-end-side openings of the first and second pump cases 62a and 62b in the state of supporting the first and second cylinder blocks 67a and 67b in a rotatable and slidable manner.

The first and second center sections 64a and 64b are respectively provided with a pair of first oil paths 210a and a pair of second oil paths 210b forming portions of the pair of first hydraulic lines 200a and the pair of second hydraulic lines 200b, first and second bypass oil paths 220a and 220b respectively fluid-connecting the pair of first oil paths 210a and connecting the pair of second oil paths 210b, check valves 230a and 230b inserted into the first and second bypass oil paths 220a and 220b, and a charge oil path 240a forming a charge line from the charge pump 90 to the pair of first oil paths 210a and the pair of second oil paths 210b (see FIG. 2).

It is preferable that the first and second center sections 64a and 64b are respectively provided with other bypass oil paths 250a and 250b which can forcibly connect the pair of first oil paths 210a and connecting the pair of second oil paths 210b.

By providing these other bypass oil paths 250a and 250b, it is possible to readily obtain a freewheeling state in forcibly towing the vehicle in the event of failure and the like of the driving source.

In this embodiment, the hydraulic motor units 160a and 160b are respectively disposed on an upper face of reduction gear boxes 162 so that the motor shafts 161 are orthogonal to the corresponding axles 121 as shown in FIG. 3 to thereby save spaces between the body frame 110 and the drive wheels 120.

Specifically, an inner face in the vehicle width direction of each the reduction gear box 162 is fastened to the body frame 110 and an outer face in the vehicle width direction of each the reduction gear box 162 supports the axle 121 in a projecting manner, the drive wheel 120 being mounted to the axle 121.

The hydraulic motor units 160a and 160b are disposed on the reduction gear boxes 162 with the above structures so that the motor shafts 161 are orthogonal to the axles 121.

Although the hydraulic motor units 160a and 160b are disposed on the upper faces of the reduction gear boxes 162 so that the motor shafts 161 are oriented in the vertical direction in the form shown in the figures, instead, it is also possible to dispose the hydraulic motor units 160a and 160b on front faces or rear faces of the reduction gear boxes 162 so that the motor shafts 161 are oriented in the horizontal direction.

In each reduction gear box 162, an intermediate shaft 163 is rotatably disposed so as to be positioned concentrically with the corresponding axle 121. Fixed to the intermediate shaft 163 is a large bevel gear 164b engaged with a small pinion 164a provided to the corresponding motor shaft 161 so as to convert power rotation from the motor shaft 161 into perpendicular one of and transmit the power rotation with reducing its speed. Further, a reduction gear 166 of a planet-gear type is inserted into a portion where the intermediate shaft 163 and the corresponding axle 121 butt to each other.

With this structure, the speed of the power output from the hydraulic motor unit 160 is reduced in two steps as a whole by the reduction gear box 162 and drives the drive wheel 120.

With reference mainly to FIG. 2, the oil hydraulic circuit of the power-dividing device 1A according to this embodiment will be described below.

A suction port of the charge pump 90 is fluid-connected to an oil tank 180 through a filter 181 and a discharge port thereof is fluid-connected to a first HST oil hydraulic circuit 300a, a second HST oil hydraulic circuit 300b, a mower lifting/lowering oil hydraulic circuit 300c and the PTO clutch mechanism oil hydraulic circuit 300d.

Specifically, a main discharge line 310 into which a main relief valve 320 is inserted is connected to the discharge port of the charge pump 90.

Hydraulic fluid is supplied to the mower lifting/lowering oil hydraulic circuit 300c from a primary side of the main relief valve 320.

For the first HST oil hydraulic circuit 300a and the second HST oil hydraulic circuit 300b, the hydraulic fluid is supplied to the charge line from a secondary side of the main relief valve 320.

The hydraulic fluid is supplied to the PTO clutch mechanism oil hydraulic circuit 300d from a drain port of the main relief valve 320.

Reference numerals 331 and 332 in FIG. 2 denote a selector valve and an accumulator which are provided to the PTO clutch mechanism oil hydraulic circuit 300d, respectively, and which are inserted into a thick-walled portion of the case member 10 (see FIG. 4).

In the power-dividing device 1A with this structure, the following effects can be obtained in addition to the above various effects.

In other words, the power-dividing device 1A is formed in such a manner that the PTO shaft 31 is disposed below the input shaft 20; the input shaft 20 and the PTO shaft 31 are coupled to each other by the power transmission mechanism 50; and the power is transmitted from the power transmission mechanism 50 to the first pump shaft 61a and the second pump shaft 61b.

With this structure, the driving power from the driving source 150 can reliably and readily be divided or split and output into a main power transmission path including the pump units 60a and 60b and an auxiliary power transmission path including the PTO unit 30.

Moreover, with the above structure, a vertical distance between the PTO shaft 31 and the input portion of the ground work machine 140 can be suppressed while suppressing a vertical distance between the input shaft 20 and the output portion of the driving source 150.

It is therefore possible to carry out, without difficulty, the power transmission between the input shaft 20 and the output portion of the driving source 150 and the power transmission between the PTO shaft 31 and the input portion of the ground work machine 140.

This point is especially advantageous when the PTO shaft 31 is coupled to the mower 140 as in this embodiment.

Figure 7:
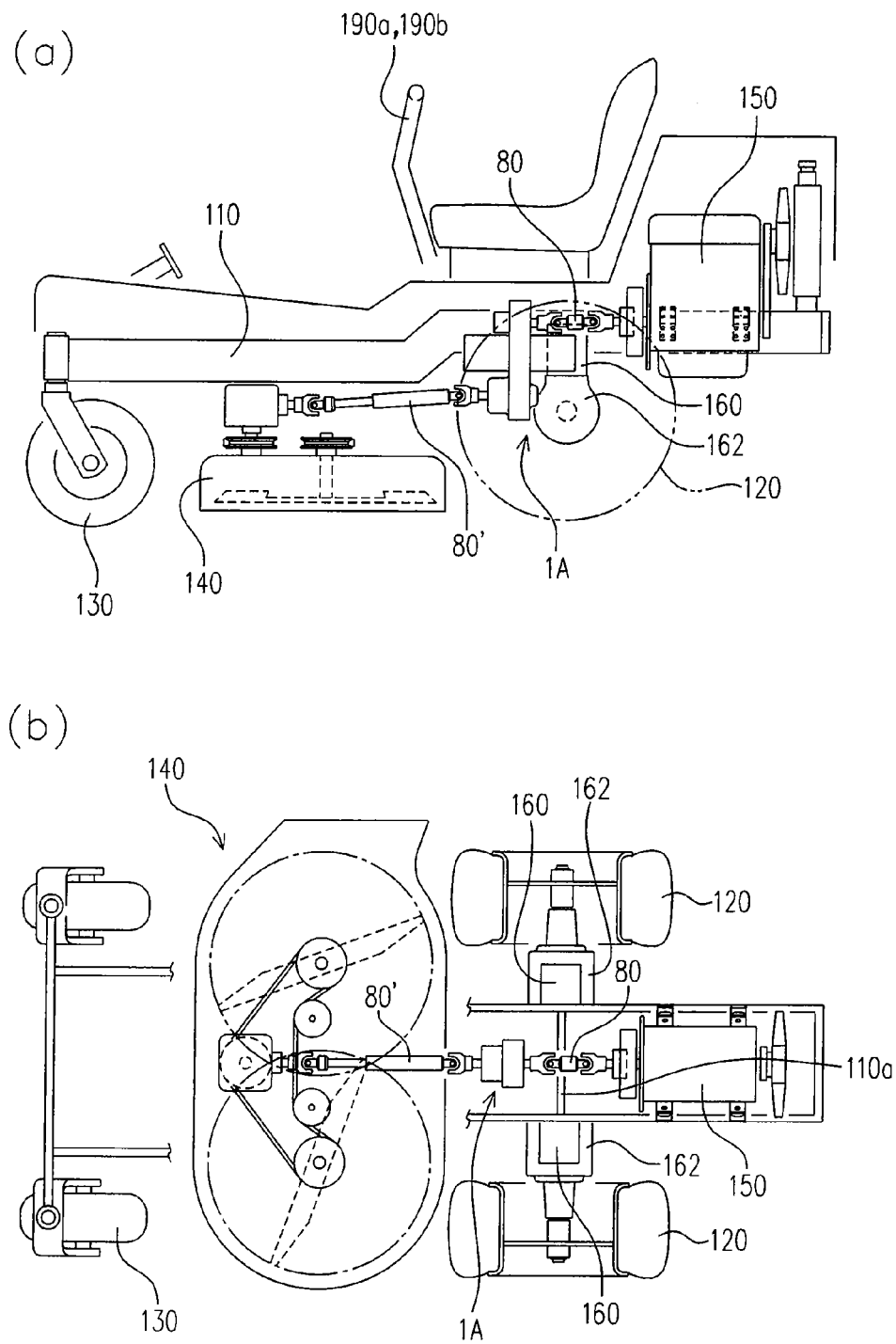
FIGS. 7(a) and 7(b) are respectively a side view and a plan view of another type of lawn mower, to which a power-dividing device according to the one embodiment of the present invention has been applied.

In other words, there are a center discharge type shown in FIGS. 1(a) and 1(b) and a side discharge type shown in FIGS. 7(a) and 7(b), in general, as a discharging structure of the mower 140.

The center discharge type or the side discharge type is appropriately selected depending on which is necessary and/or desired and heights of the input portions of the mowers 140 are normally different from each other in both the types.

In the power-dividing device 1A according to this embodiment, the PTO shaft 31 is disposed below the input shaft 20 as described above. Therefore, the vertical distance between the PTO shaft 31 and the input portion of the mower can be suppressed in both the center discharge type and side discharge type.

It is therefore possible to advantageously apply the power-dividing device 1A according to this embodiment to both a vehicle having the discharging structure of the center discharge type and a vehicle having the discharging structure of the side discharge type without addition of members or changes.

Moreover, in this embodiment, the input shaft 20 and the PTO shaft 31 are respectively disposed substantially in the same position in the vehicle width direction with respect to the output portion of the driving source 150 and the input portion of the mower 140. Therefore, the power transmission therebetween can be carried out more readily.

Although the counter shaft 53 of the power transmission mechanism 50 is positioned substantially in the same position in the vehicle width direction as the input shaft 20 and the PTO shaft 31 in this embodiment, the invention is of course not limited thereto.

Figure 8:
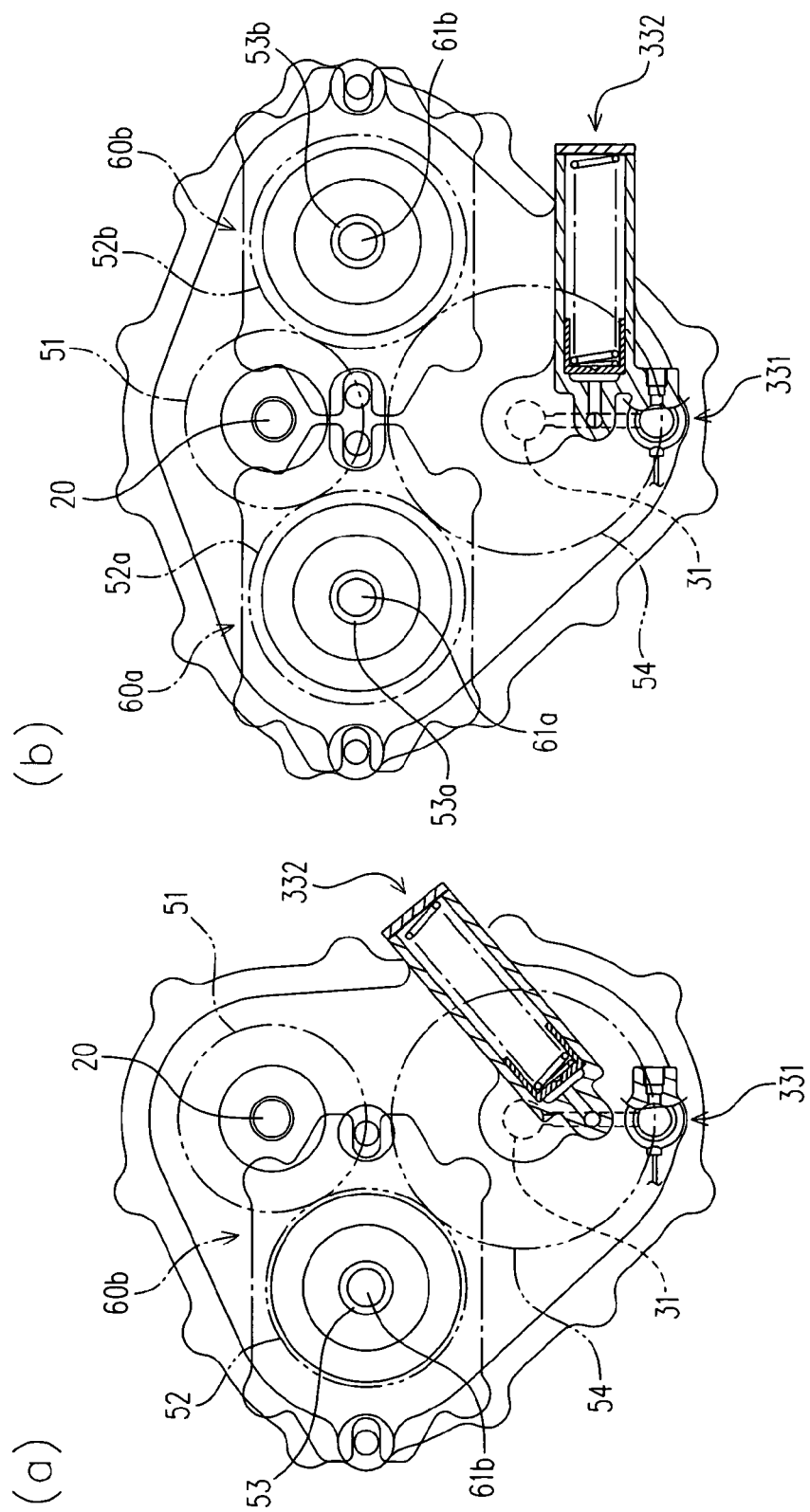
FIGS. 8(a) and (b) are back views of modified power-dividing devices shown in FIG. 6.

For example, as shown in FIG. 8(*a*), the counter shaft 53 may be displaced to a position on a first side in the vehicle width direction with respect to the input shaft 20 and the PTO shaft 31.

Although the first pump unit 60*a* and the second pump unit 60*b* are separately disposed on the first side and the second side of the case member 10 along the vehicle back and forth direction in this embodiment, it is also possible to couple the first and second pump units 60*a* and 60*b* to the same side of the case member 10 in the vehicle back and forth direction as shown in FIG. 8(*b*).

Figure 9:
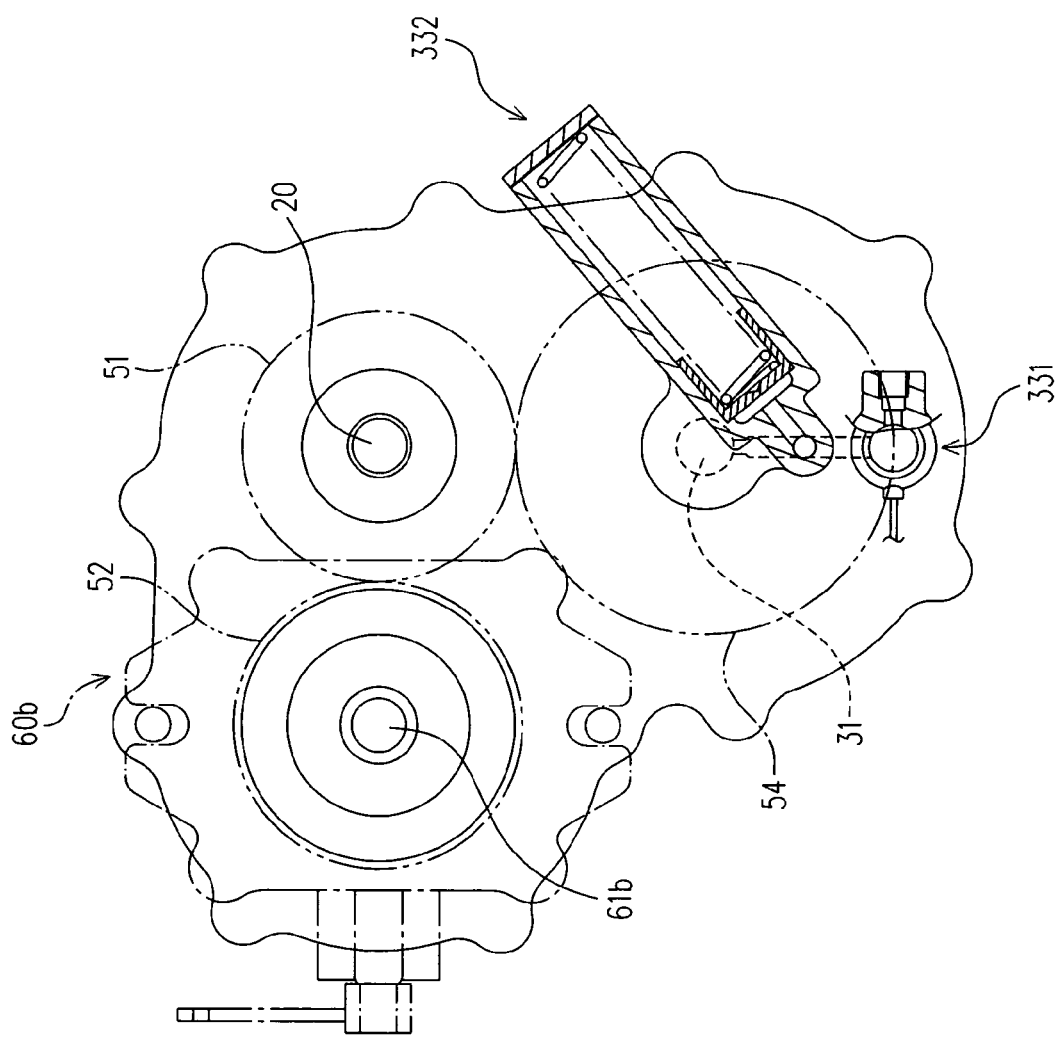
FIG. 9 is a back view of another modified power-dividing device shown in FIG. 6.

Although the input shaft 20, the first and second pump shafts 61*a* and 61*b*, and the PTO shaft 31 are in series in the power transmitting direction in the embodiment shown in FIGS. 6, 8(*a*) and 8(*b*), instead, it is also possible that the "power transmission path from the input shaft 20 to the pump shafts 61*a* and 61*b*" and the "power transmission path from the input shaft 20 to the PTO shaft 31" are in parallel (see FIG. 9). It is needless to say that the first and second hydraulic pump units 60*a* and 60*b* can separately be disposed on the first side and the second side of the case member 10 in the vehicle back and forth direction when the power transmission path from the input shaft 20 to the pump shaft 61 and the power transmission path from the input shaft 20 to the PTO shaft 31 are in parallel.

Although the first and second pump units 60*a* and 60*b* are coupled to the case member 10 in this embodiment, instead, it is also possible to accommodate the first and second pump unit main bodies 63*a* and 63*b* in the case member 10.

Although the charge pump 90 is driven by the input shaft 20 in this embodiment, instead, it is also possible that the pump shaft of one of the first and second pump units 60*a* and 60*b* has such a length as to project outward from the corresponding center section 64*a* or 64*b*; the charge pump 90 is attached to the center section to cover the projecting end portion; and the charge pump 90 is driven by the projecting end portion.

In this alternative form, although the first and second pump units 60*a* and 60*b* cannot be formed of the same structures, it is possible to supply pressure oil from the charge pump to the charge oil path of the center section provided with the charge pump without any conduit to thereby make the conduit for the charge line unnecessary.

Embodiment 2

Another embodiment of the power-dividing device according to one aspect of the invention will be described below with reference to the accompanying drawings.

Figure 10:
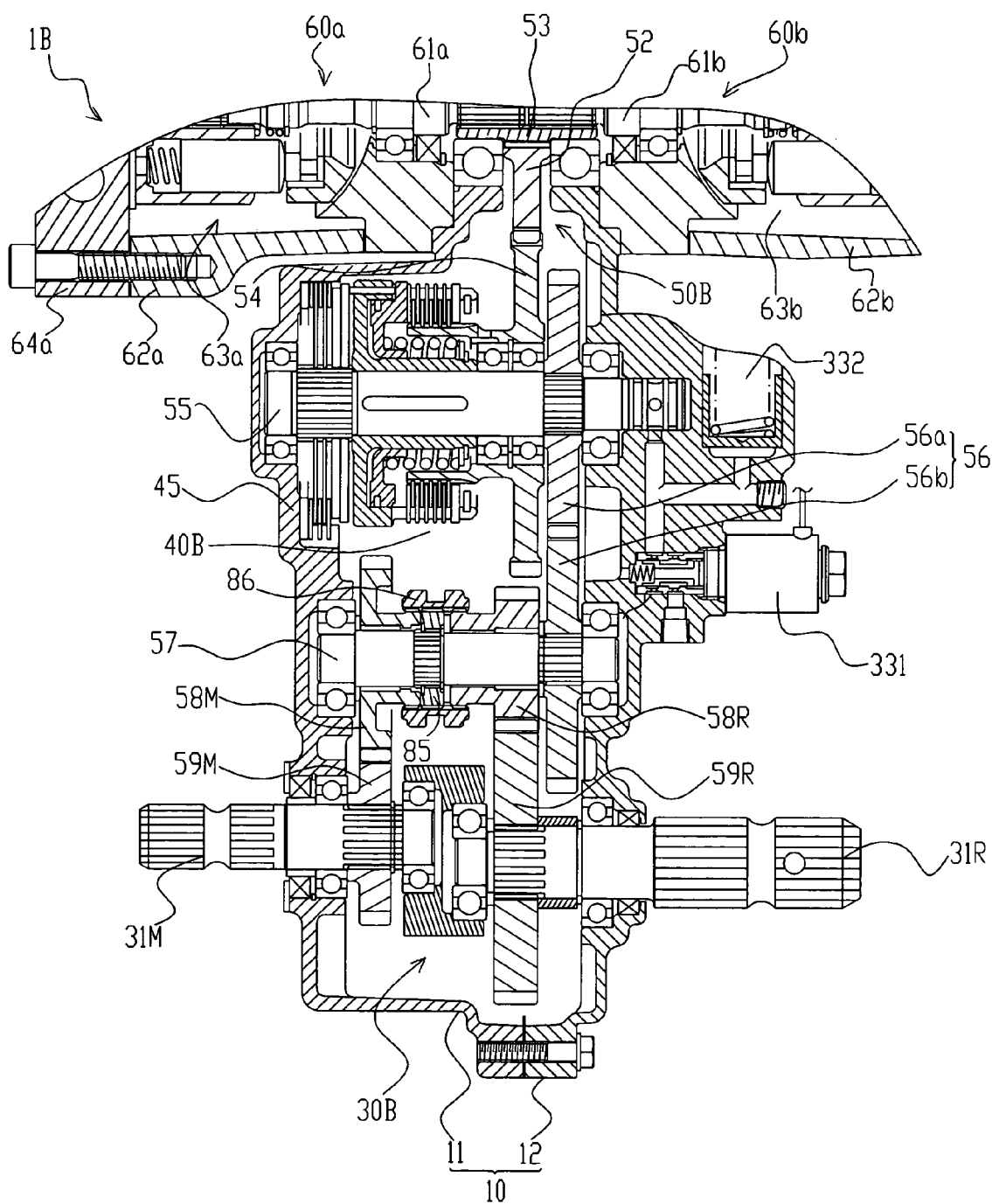
FIG. 10 is a partial vertical sectional side view of a power-dividing device according to another embodiment of the present invention.

FIG. 10 is a partial vertical sectional side view of a power-dividing device 1B according to this embodiment.

In the figures, members similar or corresponding to those in the first embodiment are provided with the same reference numerals to omit description of the members.

As shown in FIG. 10, the power-dividing device 1B according to this embodiment has two PTO shafts (a mid PTO shaft 31M and a rear PTO shaft 31R).

Specifically, the power-dividing device 1B has a power transmission mechanism 50B instead of the power transmission mechanism 50 and has a PTO unit 30B instead of the PTO unit 30 in the power-dividing device 1A according to the first embodiment.

The power transmission mechanism 50B includes the drive-side gear 51 (not shown in FIG. 10), the counter gear 52, the counter shaft 53, the driven-side gear 54, a PTO power transmission shaft 55 for supporting the driven-side gear 54 in a relative rotatable manner, a direction selector shaft 57 operatively connected to the PTO power transmission shaft 55 through appropriate power transmission members 56 (power transmission gears 56*a* and 56*b* in the form shown in the figures), a mid PTO drive-side member 58M and a rear PTO drive-side member 58R supported on the direction selector shaft 57 so as to be rotatable with respect to the direction selector shaft 57, a mid PTO driven-side member 59M non-rotatable with respect to the mid PTO shaft 31M while being engaged with the mid PTO drive-side member 58M, a rear PTO driven-side member 59R non-rotatable with respect to the rear PTO shaft 31R while being engaged with the rear PTO drive-side member 58R, a sleeve 85 supported on the direction selector shaft 57 so as to be non-rotatable with respect to the direction selector shaft 57 and so as to be positioned between the mid PTO drive-side member 58M and the rear PTO driven-side member 59R, and a selector slider 86 supported on the sleeve 85 so as to be non-rotatable and axially slidable with respect to the sleeve 85.

Spline is formed on an outer peripheral face of an end portion of the mid PTO drive-side member 58M close to the sleeve 85.

Similarly, splines with substantially the same pitch are formed on an outer peripheral face of an end portion of the rear PTO drive-side member 58R close to the sleeve 85.

Further, splines with substantially the same pitch are formed on an outer peripheral face of the sleeve 85.

On an inner peripheral face of the selector slider 86, splines to be engaged with the splines of the mid PTO drive-side member 58M, the rear PTO drive-side member 58R and the sleeve 85 are formed.

Specifically, the selector slider 86 can be positioned at (1) a mid output position to connect only the mid PTO drive-side member 58M with the direction selector shaft 57, (2) a both output position to connect both the mid PTO drive-side member 58M and the rear PTO drive-side member 58R with the direction selector shaft 57, and (3) a rear output position to connect only the rear PTO drive-side member 58R with the direction selector shaft 57, along an axial direction of the direction selector shaft 57.

Operation of the selector slider 86 by moving is carried out by an appropriate operating mechanism such as a shift fork (not shown).

The PTO unit 30B includes the mid PTO shaft 31M, the rear PTO shaft 31R, and a PTO clutch mechanism 40B for selectively engaging/interrupting power transmission from the driven-side gear 54 to the PTO power transmission shaft 55.

The PTO clutch mechanism 40B has substantially the same structure as the PTO clutch mechanism 40 in the first embodiment except that the PTO clutch mechanism 40B is supported on the PTO power transmission shaft 55.

Therefore, detailed description of the PTO clutch device 40B will not be made.

According to this embodiment, in addition to the effects in the first embodiment, the auxiliary power transmission path can be divided or split and output into two routes.

Therefore, if a second work device such as a fan for forcibly sending lawn debris which has been sent from the mower 140 through the rear discharge duct 145 (see FIGS. 1(a) and 1(b)) into a grass collection bag disposed at the rear of the vehicle frame is provided in addition to the first work device such as the mower 140, it is possible to readily take out the driving power for the second work device.

Embodiment 3

A preferred embodiment of an axle-driving device according to another aspect of the invention will be described below with reference to the accompanying drawings.

An axle-driving device 3 according to the invention includes a motor unit forming a non-stepwisely changeable transmission in cooperation with the driving actuator for each drive axle so as to independently drive each the drive axle at a stepwisely changeable speed.

In this embodiment, a case where hydraulic pump units are used as the driving actuators and hydraulic motor units forming HSTs in cooperation with the hydraulic pump units are used as the motor units will be described as an example. However, the axle-driving device according to the invention also includes a form having electric motor units as the motor units. When the electric motor units are used, generators or the like are used as the driving actuators.

First, one example of a vehicle to which the axle-driving device 3 according to this embodiment can be applied will be described.

Figure 11:
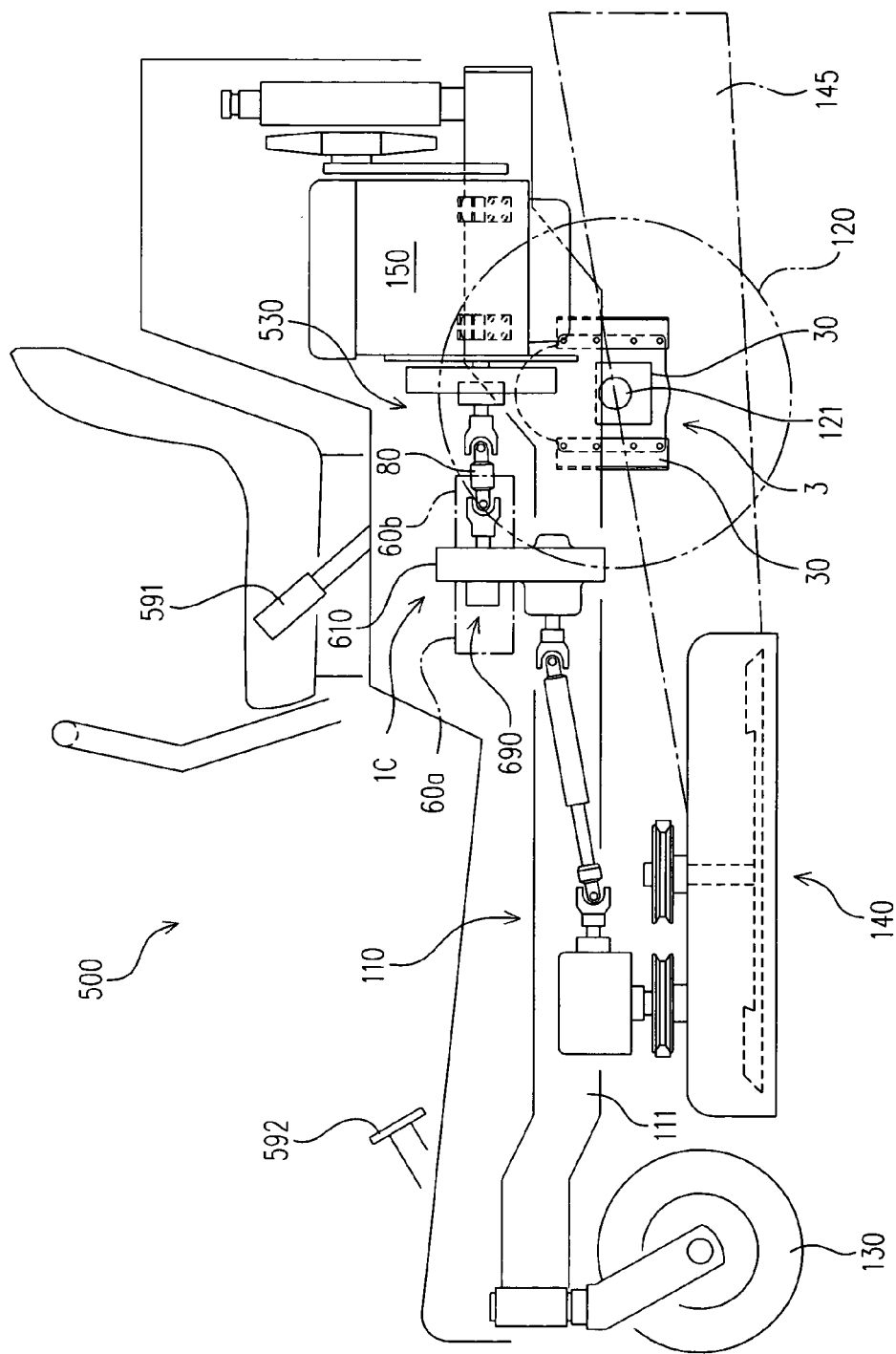
FIG. 11 is a schematic side view of a vehicle to which an axle-driving device according to one embodiment of the present invention has been applied.
Figure 12:
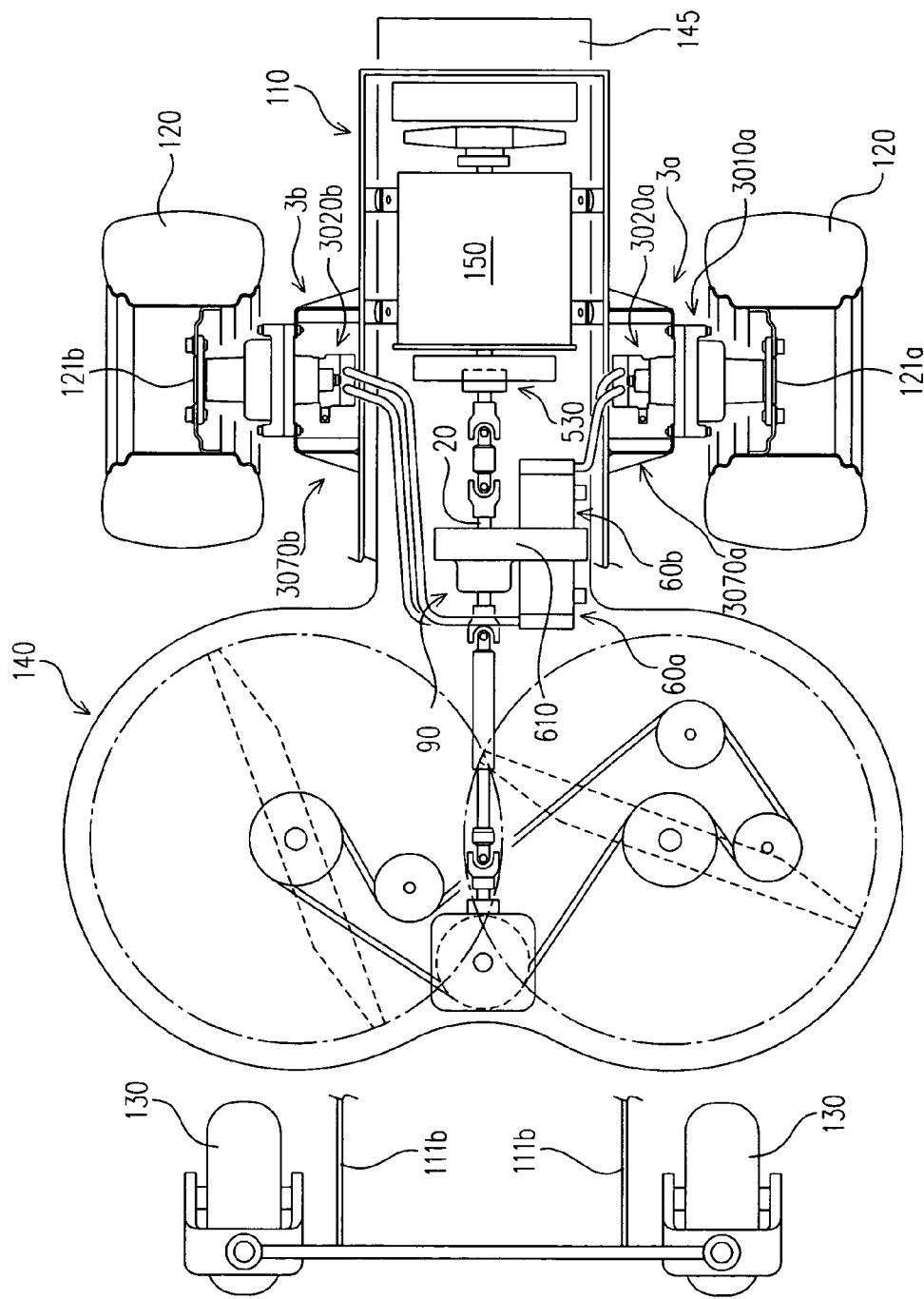
FIG. 12 is a schematic plan view of the vehicle shown in FIG. 11.
Figure 13:
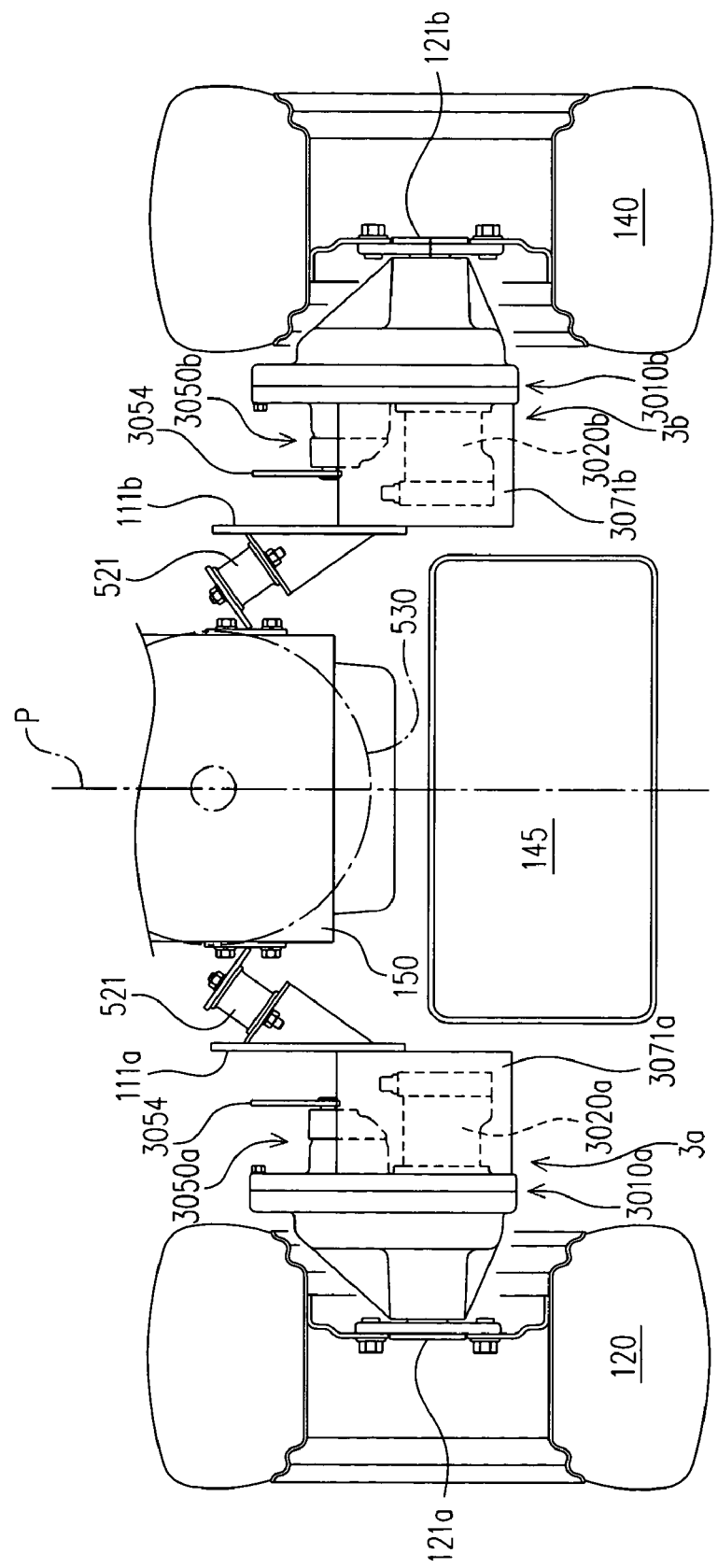
FIG. 13 is a schematic back view of the vehicle shown in FIGS. 11 and 12.
Figure 14:
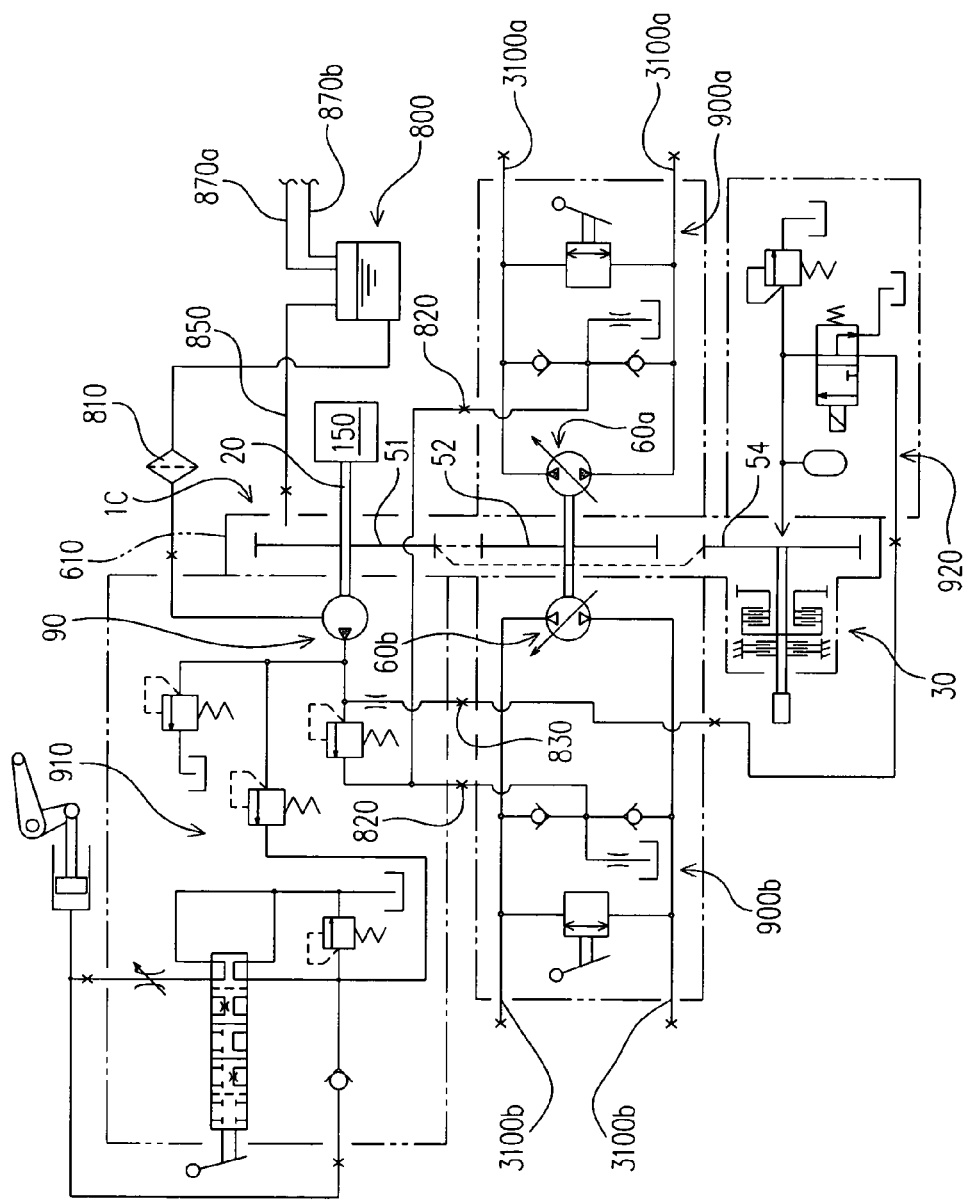
FIG. 14 is an oil hydraulic circuit diagram of one part of the vehicle shown in FIGS. 11-13.
Figure 15:
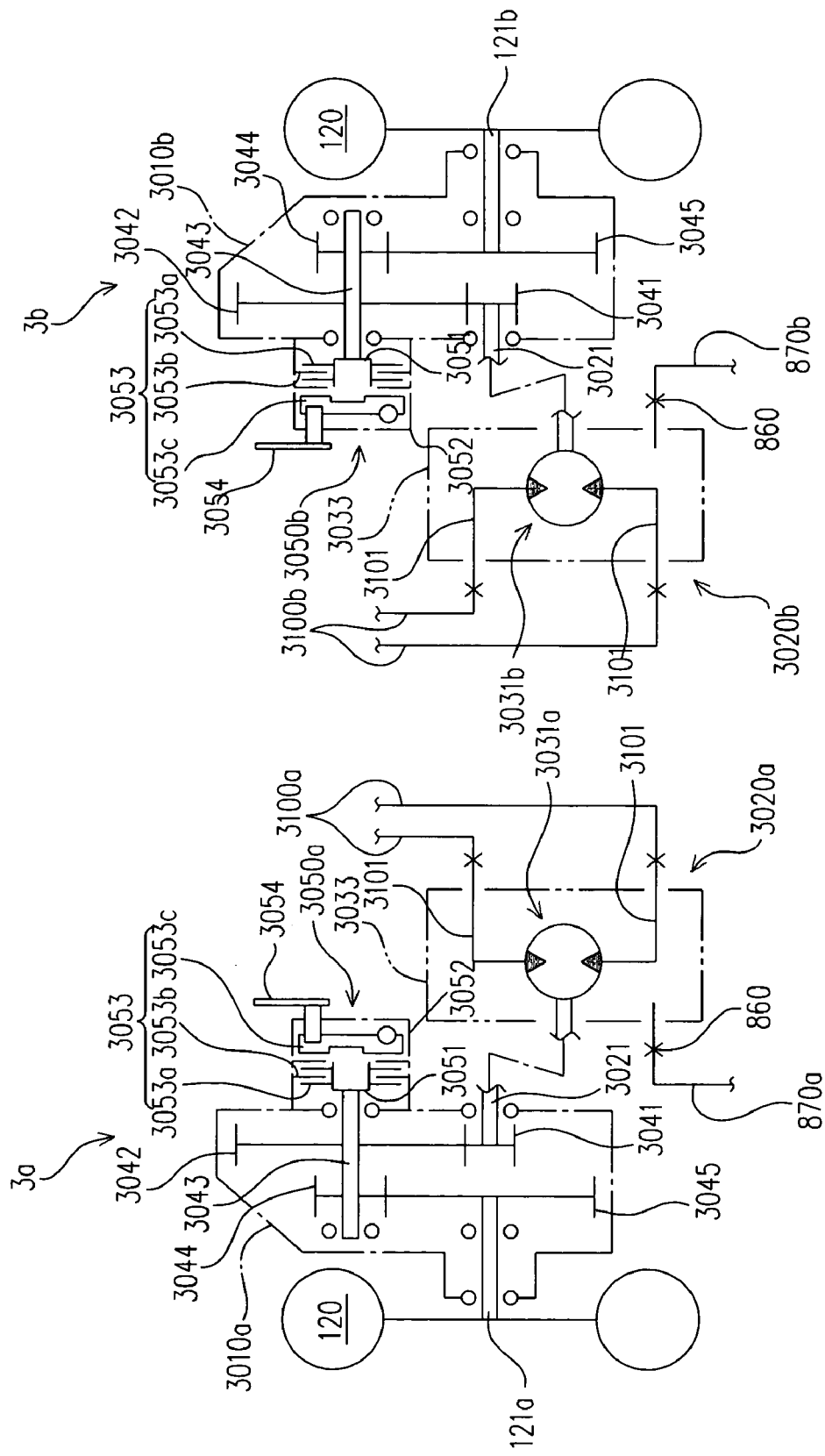
FIG. 15 is an oil hydraulic circuit diagram of another part of the vehicle shown in FIGS. 11-13.

FIGS. 11 to 13 are a schematic side view, a schematic plan view and a schematic back view of the vehicle 500 to which the axle-driving device 3 according to this embodiment is applied, respectively. FIGS. 14 and 15 are oil hydraulic circuit diagrams of the vehicle 500, respectively.

As shown in FIGS. 11 to 15, the vehicle 500 includes a body frame 110 having a pair of main frames 111 disposed along a back and forth direction of the vehicle, an engine 150 supported on the body frame 110, a power-dividing device 1C to which output from the engine 150 is input through a flywheel 530, a pair of drive wheels 120, a pair of first and second drive axles 121a and 121b coupled to the pair of drive wheels 120, respectively, so as to be non-rotatable with respect to the drive wheels 120, and first and second axle-driving devices 3a and 3b according to this embodiment formed to be able to independently drive the first and second drive axles 121a and 121b.

In this embodiment shown in the figures, in addition to the above structure, the vehicle 500 includes caster wheels 130 supported at a front portion of the body frame 110 and a mower 140 disposed between the caster wheels 130 and the drive wheels 120 in the back and forth direction of the vehicle.

As shown in FIGS. 11 to 13, the engine 150 is supported in a vibration-preventing manner on the pair of main frames 111 through vibration-preventing rubbers 521 in a position behind the drive axles 121.

In the embodiment shown in the figures, the engine 150 is supported on the pair of main frames 111 through the vibration-preventing rubbers 521 in front, rear, left and right four positions.

Figure 16:
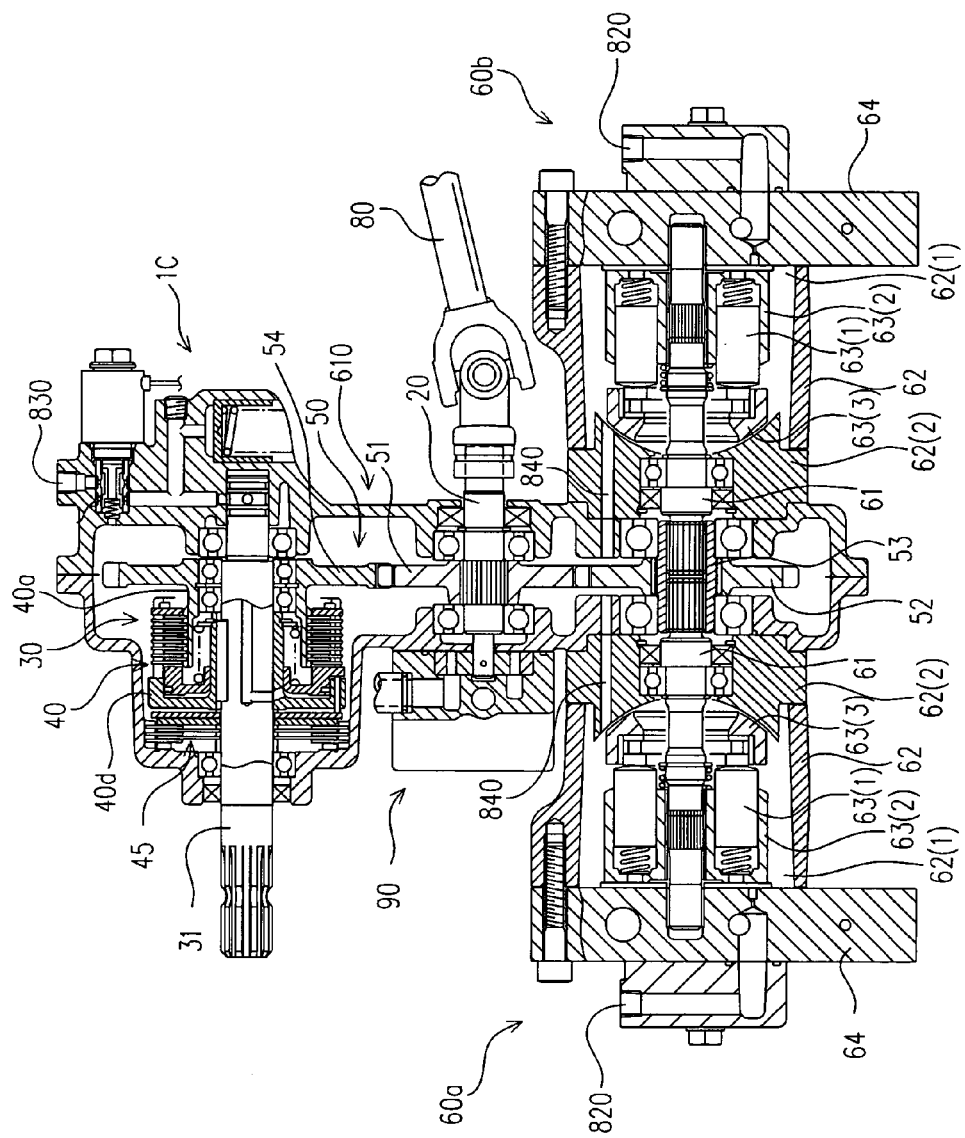
FIG. 16 is a developed plan view of the power-dividing device of the vehicle shown in FIGS. 11-13.
Figure 17:
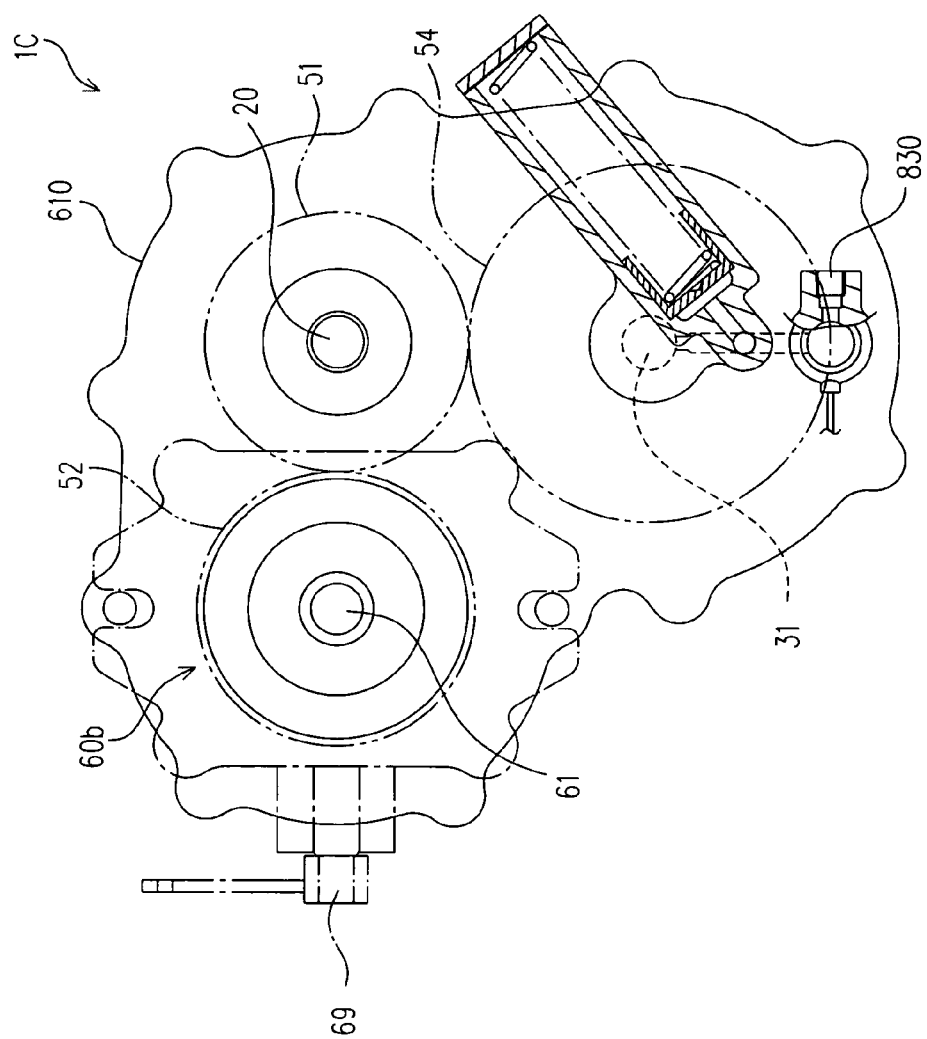
FIG. 17 is a back view of the power-dividing device of the vehicle shown in FIGS. 11-13.

FIGS. 16 and 17 are a developed plan view and a back view of the power-dividing device 1C, respectively.

As shown in FIGS. 16 and 17, the power-dividing device 1C includes a case member 610, an input shaft 20 supported by the case member 610 so as to be operatively connected to the engine 150 through the flywheel 530 and a power transmission shaft 80 having a universal joint, first and second hydraulic pump units 60a and 60b coupled to and supported by the case member 610, a PTO unit 30 accommodated in the case member 610, and a power transmission mechanism 50 for transmitting power from the input shaft 20 to the first and second hydraulic pump units 60a and 60b and the PTO unit 30.

The first and second hydraulic pump units 60a and 60b form first and second HSTs in cooperation with first and second hydraulic motor units which will be described later, respectively.

In other words, as shown in FIGS. 14 and 15, the first hydraulic pump unit 60a and the first hydraulic motor unit are fluid-connected by flow paths such as a pair of conduits so as to form a closed circuit and at least one of the first hydraulic pump unit 60a and the first hydraulic motor unit is of a variable displacement type.

Similarly, the second hydraulic pump unit 60b and the second hydraulic motor unit are fluid-connected by flow paths such as a pair of conduits so as to form a closed circuit and at least one of the second hydraulic pump unit 60b and the second hydraulic motor unit is of a variable displacement type.

In this embodiment, the first and second hydraulic pump units 60a and 60b are of the variable displacement type and the first and second hydraulic motor units which will be specifically described later are of a fixed displacement type.

In this embodiment, the first and second pump units 60a and 60b are separately disposed on front and rear faces of the case member 610.

Specifically, as shown in FIGS. 16 and 17, each of the first and second hydraulic pump units 60a and 60b includes a pump shaft 61 operatively connected to the input shaft 20, a piston 63(1) for rotating about an axis of the pump shaft 61 and reciprocate along the axis of the pump shaft 61 as the pump shaft 61 rotates about the axis, a cylinder block 63(2) which houses the piston 63(1) in a reciprocatable manner and which rotates with the piston 63(a), an output adjusting member 63(3) for determining a stroke length of the piston 63(1) according to a slanting position to change a suction/discharge rate by the piston 63(1), a control shaft 69 coupled to the output adjusting member 63(3) so as to be able to control the slanting position of the output adjusting member 63(3) from outside, a pump case 62 having an opening 62(1) into which the cylinder block 63(2), the piston 63(1) and the output adjusting member 63(3) can be inserted to accommodate them, and a center section 64 which supports the cylinder block 63(2) in a rotatable manner and which is coupled to the pump case 62 so as to close the opening 62(1).

The pistons 63(1), the cylinder blocks 63(2) and the output adjusting members 63(3) form the first and second hydraulic pump main bodies 63a and 63b in the first embodiment.

In the form shown in the figures, back face sides 62(2) of the first and second hydraulic pump units 60a and 60b on opposite sides to the openings 62(1) in the pump cases 62 are coupled to the case member 610, respectively.

The PTO unit 30 includes a PTO shaft 31 supported by the case member 610 so that a first end portion of the shaft 31 extends outward, a drive-side member 40a operatively connected to the input shaft 20, a driven-side member 40d supported on the PTO shaft 31 so as to be non-rotatable with respect to the PTO shaft 31, and a hydraulic clutch device 40 for engaging/interrupting power transmission from the drive-side member 40a to the driven-side member 40d.

In the embodiment shown in the figures, the PTO unit 30 includes a hydraulic braking device 45 for releasing/applying a braking force from and to the PTO shaft 31 in synchronization with engagement/interruption by the hydraulic clutch device 40.

The power transmission mechanism 50 includes an input gear (drive-side gear) 51 supported on the input shaft 20 so as to be non-rotatable with respect to the input shaft 20, a pump gear (counter gear) 52 which is supported on the respective pump shafts 61 of the first and second hydraulic pump units 60a and 60b through the counter shaft 53 so as to be non-rotatable with respect to the pump shafts 61 and which is engaged with the input gear 51, and a PTO gear (driven-side gear) 54 provided to the drive-side member 40a in the PTO unit 30 and engaged with the input gear 51.

In other words, in the embodiment shown in the figures, as shown in FIG. 17, the power transmission mechanism 50 includes a hydraulic pump path for transmitting power from the input shaft 20 to the first and second hydraulic pump units 60a and 60b and a PTO path for transmitting power from the input shaft 20 to the PTO unit 30.

The power-dividing device 1C shown in the figures includes a charge pump unit 90 operatively connected to the input shaft 20 in addition to the above structure.

The charge pump unit 90 is formed to supply hydraulic fluid to the hydraulic clutch device 40 and the hydraulic braking device 45 in the PTO unit 30, the first and second HSTs, and other hydraulic mechanisms provided to the vehicle 500.

Next, the first axle-driving device 3a will be described.

The second axle-driving device 3b and the first axle-driving device 3a have symmetric structures with respect to a fictitious central vertical plane P along a longitudinal direction of the vehicle (see FIG. 13). Therefore, the following description of the first axle-driving device 3a is also applied to the second axle-driving device 3b.

Figure 18:
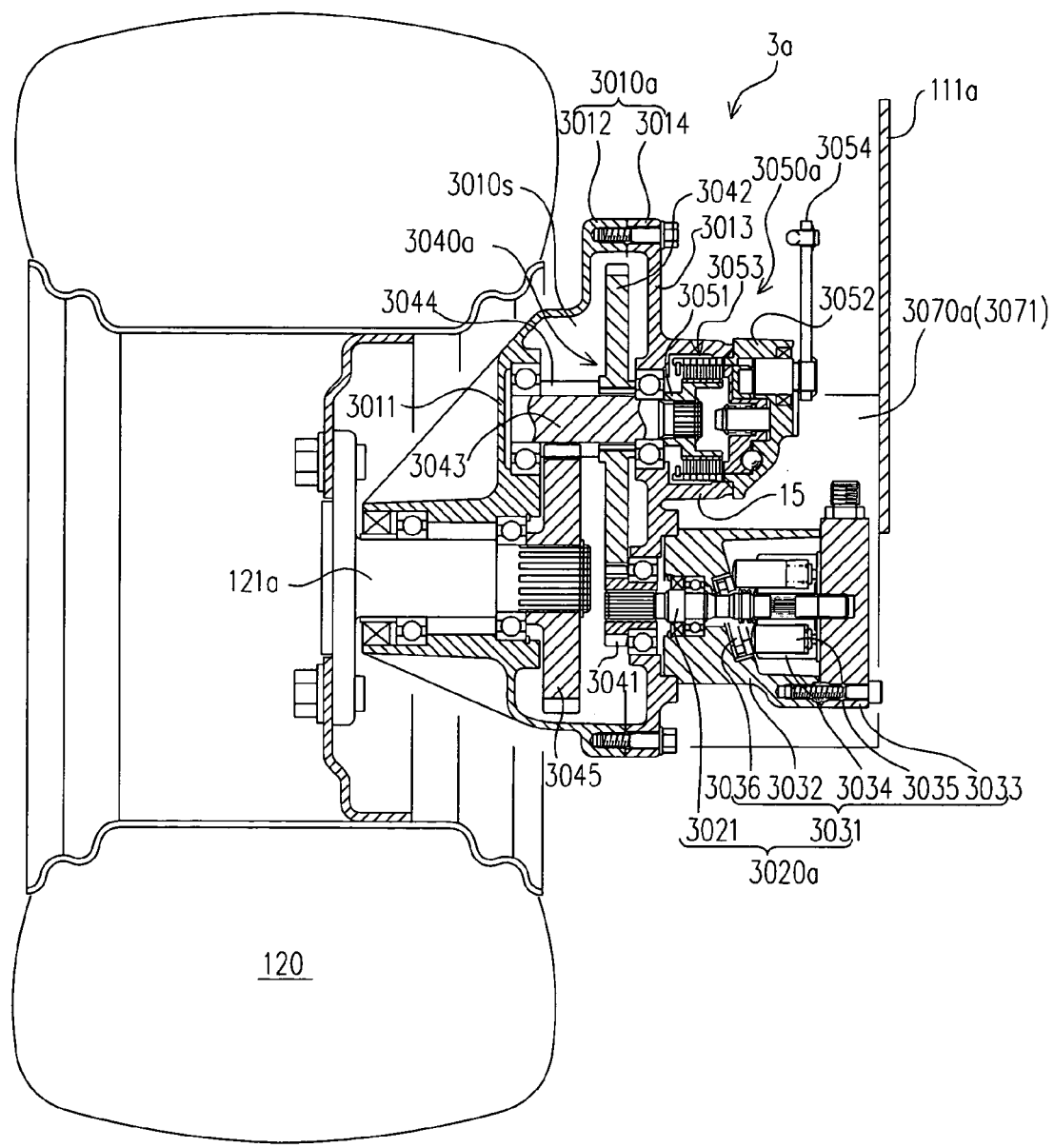
FIG. 18 is a vertical sectional back view of the axle-driving device shown in FIGS. 11-13.
Figure 19:
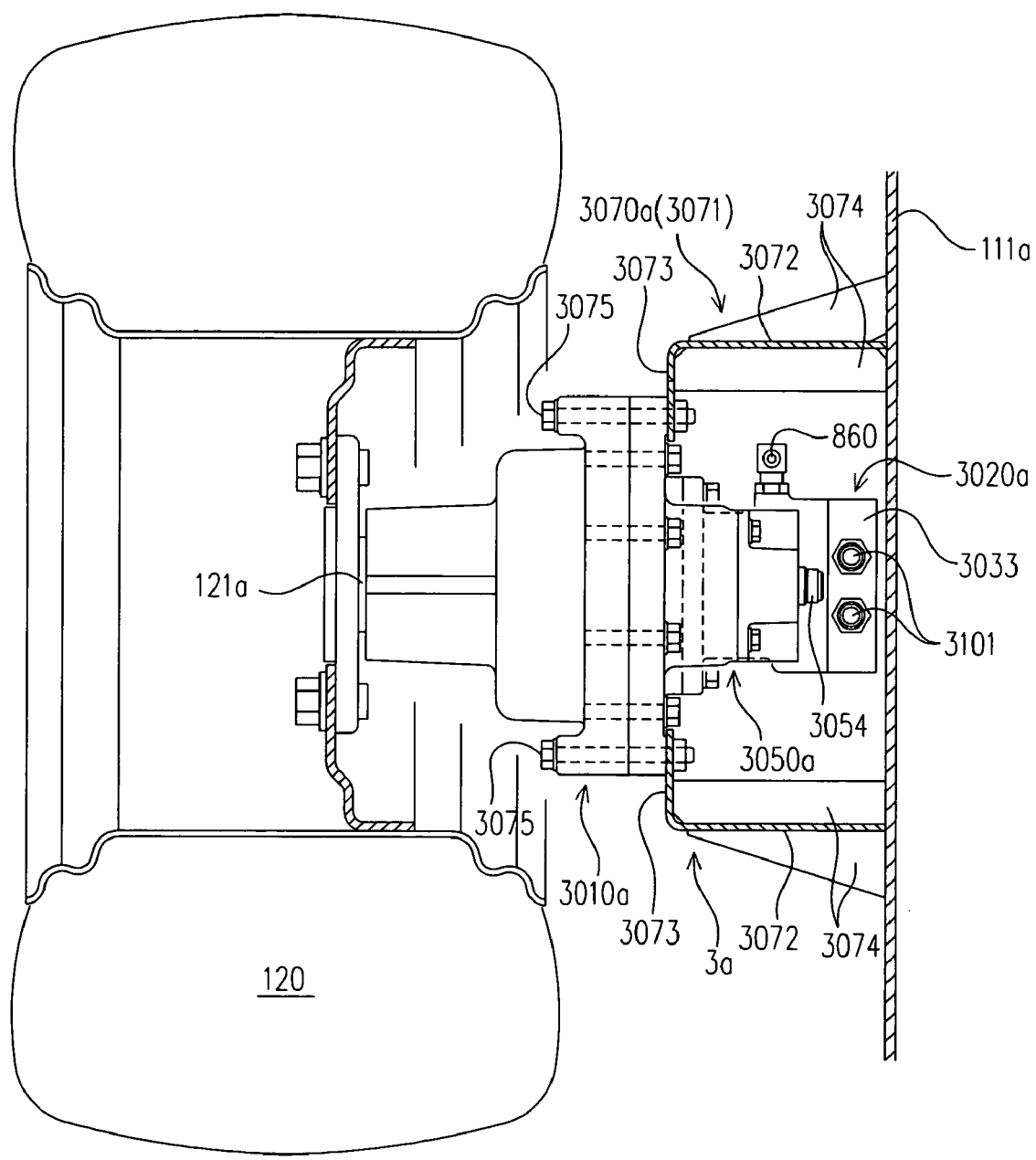
FIG. 19 is a plan view of the axle-driving device shown in FIG. 18.
Figure 20:
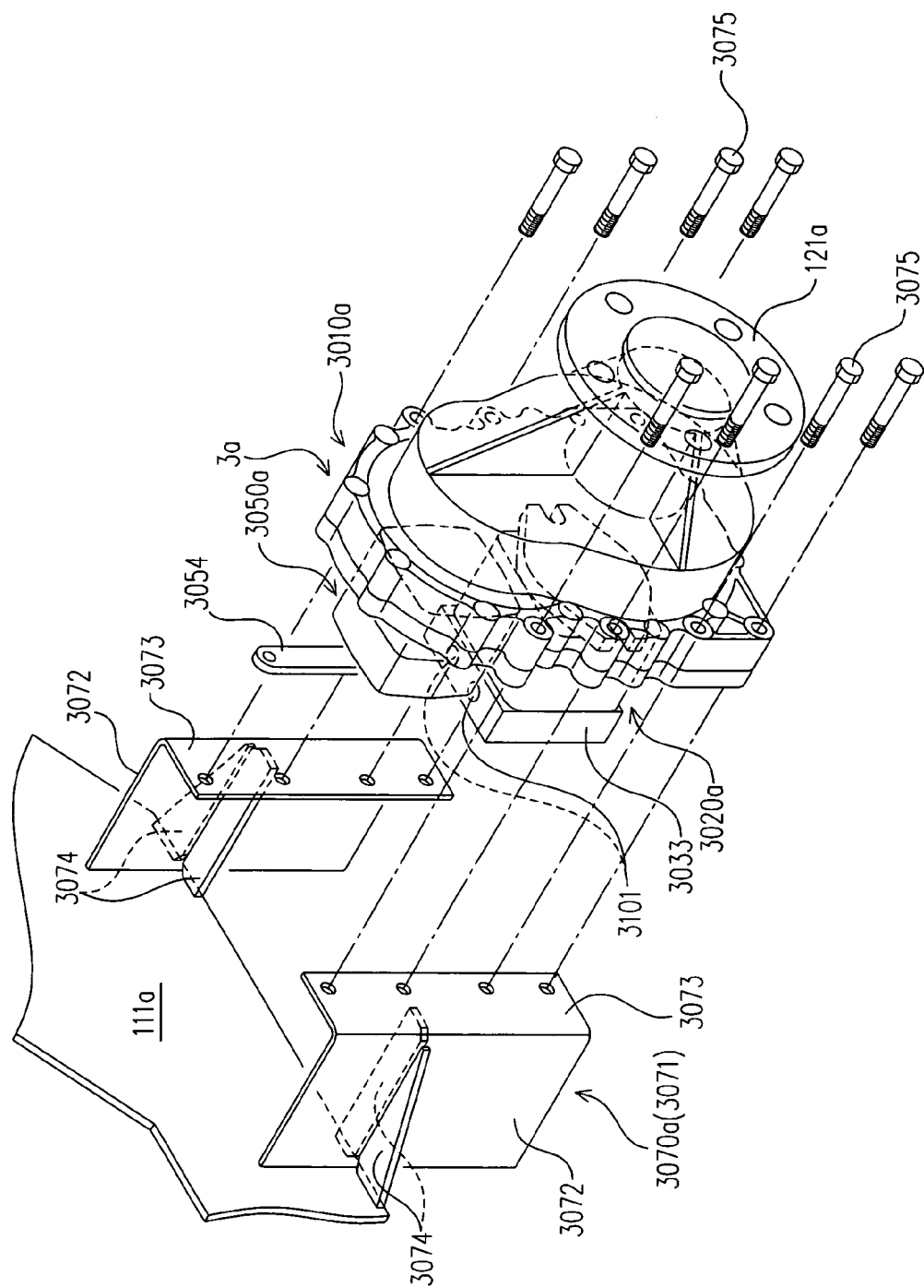
FIG. 20 is an exploded perspective view of the axle-driving device shown in FIGS. 18 and 19.

FIGS. 18 to 20 are a vertical sectional back view, a plan view and an exploded perspective view of the first axle-driving device 3a, respectively.

The first axle-driving device 3a includes a first axle case 3010a for supporting the corresponding first drive axle 121a in a rotatable manner about its axis, a first hydraulic motor unit 3020a coupled to and supported by the axle case 3010a, a first reduction power transmission unit 3040a for transmitting power from the first hydraulic motor unit 3020a to the first drive axle 121a with reducing a speed, a first brake unit 3050a capable of directly or indirectly applying a braking force to the first drive axle 121a, and a first support member 3070a for coupling and supporting the first axle case 3010a to and by the body frame 110.

As shown in FIGS. 18 and 19, the first axle case 3010a is constructed to be connected with one of the pair of main frames 111 (the first main frame 111a) on an outside surface thereof in the vehicle width direction and support the first drive axle 121a.

In other words, as shown in FIG. 13, the first and second axle cases 3010a and 3010b are respectively positioned outside the first and second main frames 111a and 111b in the vehicle width direction to thereby obtain a free space between the first and second main frames 111a and 111b.

With this structure, it is easy to change specifications between a center discharge type in which a discharge duct 145 for the mower 140 is disposed between the pair of drive axles 121a and 121b and other types.

As shown in FIG. 18, the first axle case 3010a includes an outer wall 3011 for supporting the first drive axle 121a in a rotatable manner about its axis and an inner wall 3013 separated inward in the vehicle width direction from the outer wall 3011 so that an inner end portion of the first drive axle 121a is positioned between the outer wall 3011 and the inner wall 3013.

In other words, an accommodating space 3010S is defined by the outer wall 3011 and the inner wall 3013 in the first axle case 3010a, and the inner end portion of the first drive axle 121a is positioned in the accommodating space 3010S of the axle case 3010.

In this embodiment, the first axle case 3010a includes an outer member 3012 having the outer wall 3011 and an inner member 3014 having the inner wall 3013, and the outer member 3012 and the inner member 3014 are detachably coupled to each other through fastening members such as bolts.

The first hydraulic motor unit 3020a is fluid-connected to the first hydraulic pump unit 60a through the flow paths such as a pair of conduits to form the closed circuit and forms the first HST in cooperation with the first hydraulic pump unit 60a as described above.

The first hydraulic motor unit 3020a includes a motor shaft 3021 supported by the inner wall 3013 in a rotatable manner about its axis so that an outer end portion of the motor shaft 3021 in the vehicle width direction is positioned in the accommodating space in the axle case 3010a, and a hydraulic motor main body 3031a coupled to and supported by the inner wall 3013 from outside as shown in FIG. 18.

The hydraulic motor main body 3031a includes a motor case 3032 coupled to the inner wall 3013 of the axle case 3010a and open at an end face opposite to the inner wall 3013, a center section 3033 coupled to the motor case 3032 so as to close the opening of the motor case 3032, a cylinder block 3034 supported by the center section 3033 so as to be rotatable about the motor shaft 3021 and so as to be positioned in an inner space defined by the motor case 3032 and the center section 3033, a piston 3035 accommodated in a reciprocatable manner in the cylinder block 3034, and a swash plate 3036 for restricting a range of reciprocation of the piston 3035.

In the center section 3033, oil paths 3101 forming a portion of flow paths 3100a between the corresponding first hydraulic motor unit 3032a and the first hydraulic pump unit 60a are formed. The oil paths 3101 are open to the outside at first end portions thereof and communicate with the cylinder block 3034 at second end portions thereof (see FIG. 15).

By hydraulic fluid supplied and discharged through the oil paths 3101, the piston 3035 reciprocates in the cylinder block 3034 and rotates about the motor shaft 3021 and, as a result, the cylinder block 3034 and the motor shaft 3021 rotate about the axis of the motor shaft 3021.

The first reduction power transmission unit 3040a includes an output gear 3041 supported on an outer end portion of the motor shaft 3021 in the vehicle width direction so as to be non-rotatable with respect to the motor shaft

3021, a first intermediate gear 3042 engaged with the output gear 3041, an intermediate shaft 3043 provided with the first intermediate gear 3042 and supported by the axle case 3010a so as to be positioned above the motor shaft 3021, a second intermediate gear 3044 provided to the intermediate shaft 3043, and a final gear 3045 engaged with the second intermediate gear 3044 and supported on an inner end portion of the first drive axle 121a in the vehicle width direction so as to be non-rotatable with respect to the first drive axle 121a. The thus arranged unit 3040a can reduce a speed of and transmit driving output from the motor shaft 3021 to the first drive axle 121a.

As described above, in the first axle-driving device 3a according to this embodiment, the first reduction power transmission unit 3040a is provided between the first hydraulic motor unit 3020a and the corresponding first drive axle 121a and, as a result, the highly-reliable, low-torque and high-speed rotation motor can be used as the first hydraulic motor unit 3020a.

Such a low-torque and high-speed rotation motor has advantages that it can be made compact; a leak amount of the hydraulic fluid is small; and volumetric efficiency is high over a high-torque and low-speed rotation motor.

The first brake unit 3050a selectively applies the braking force to the intermediate shaft 3043 to thereby independently apply the braking force to the corresponding first drive axle 121a.

The first brake unit 3050a is disposed by utilizing an idle space above the first hydraulic motor unit 3020a.

Specifically, the intermediate shaft 3043 is supported by the axle case 3010a so that an inner end portion of the intermediate shaft 3043 in the vehicle width direction extends outward. The first brake unit 3050a is formed to be able to act on the inner end portion of the intermediate shaft 3043 in the vehicle width direction.

In this embodiment, the inner wall 3013 of the axle case 3010a has a rib 3015 extending inward in the vehicle width direction so as to surround the inner end portion of the intermediate shaft 3043 in the vehicle width direction. The first brake unit 3050a is mounted to the rib 3015.

More specifically, the first brake unit 3050a includes a rotary member 3051 supported on the inner end portion of the intermediate shaft 3043 in the vehicle width direction so as to be non-rotatable with respect to the intermediate shaft 3043, a fixed member 3052 supported by the axle case 3010a, a friction braking device 3053 for operatively applying a friction force between the rotary member 3051 and the fixed member 3052, and an operating arm 3054 for actuating the friction braking device 3053 by operation from outside.

The friction braking device 3053 includes a rotating-side friction disc 5303a supported by the rotary member 3051 so as to be non-rotatable with respect to the rotary member 3051, a fixed-side friction disc 3053b supported by the fixed member 3052 so as to be non-rotatable with respect to the fixed member 3052 and so as to face the rotating-side friction disc 3053a, and an actuating member 3053c for bringing the rotating-side friction disc 3053a and the fixed-side friction disc 3053b into frictional engagement with each other based on operation of the operating arm 3054 (see FIG. 15).

In this embodiment, a ball cam mechanism is employed as the actuating member 3053c. The actuating member 3053c bring the rotating-side friction disc 3053a and the fixed-side friction disc 3053b into frictional engagement with each other by a swinging action of the arm 3054 about a pivot axis parallel to the intermediate shaft 3043.

Various structures may be employed as the first support member 3070a as long as the structure can couple and support the axle case 3010a to and by the first main frame 111a.

As shown in FIGS. 18 to 20, in this embodiment, a mounting stay 3071 having a proximal end portion coupled to the first main frame 111a and a distal end portion supporting the axle case 3010a is used as the support member 3070a.

The mounting stay 3071 is formed so that a surrounded space in which the first hydraulic motor unit 3020a is positioned and at least an upper side of which is open is formed between the inner wall 3013 of the axle case 3010a and the first main frame 111a.

Specifically, the mounting stay 3071 includes a pair of side wall portions 3072 having proximal end portions coupled to the first main frame 111a and a pair of mounting portions 3073 extending from distal (outer) end portions of the pair of side wall portions 3072 toward each other, and having an opening which is formed between opposed end portions of the mounting portions 3073 and through which the first hydraulic motor unit 3020a and the first brake unit 3050a can be inserted. The thus mounting stay 3071 forms the surrounded space which is defined by the pair of side wall portions 3072, the mounting portions 3073 and the first main frame 111a as shown in FIGS. 19 and 20.

By provision of the mounting stay 3071 with such a structure, it is possible to mount an assembly of the first axle case 3010a, the first hydraulic motor unit 3020a, the first reduction power transmission unit 3040a and the first brake unit 3050a to the mounting stay 3071 from outside in the vehicle width direction in the state where the mounting stay 3071 is mounted to the body frame 110. As a result, workability in assembly of the first axle-driving device 3a to the body frame 110 can be improved.

Reference numerals 3074 and 3075 in FIG. 20 denote reinforcing plates and fastening bolts, respectively.

In the first axle-driving device 3a with such a structure, the following effects can be obtained in addition to the above various effects.

In other words, in this embodiment, as is well shown in FIG. 18, the first hydraulic motor unit 3020a is coupled to the inner wall 3013 of the axle case 3010a so that at least a portion of the first hydraulic motor unit 3020a overlaps with the final gear 3045 when viewed along the axial direction of the first drive axle 121a.

Therefore, without upsizing the first axle case 3010a, the first hydraulic motor unit 3020a can be coupled to and supported by the first axle case 3010a.

Moreover, the first brake unit 3050a and the first hydraulic motor unit 3020a are separately disposed on upper and lower sides in the surrounded space in the mounting stay 3071.

In other words, the first brake unit 3050a is coupled to the inner wall 3013 of the axle case 3010a by utilizing the idle space above the first hydraulic motor unit 3020a in the surrounded space in the mounting stay 3071.

With this structure, because the first brake unit 3050a and the first hydraulic motor unit 3020a are not arranged in parallel with each other in the vehicle width direction, it is possible to obtain a free space as large as possible between the pair of drive wheels 120 without increasing a distance between the pair of drive wheels 120.

In this embodiment, the engine 150 is disposed at an upper portion and the center discharge duct 145 in the mower 140 is disposed at a lower portion in the free space between the pair of drive wheels (see FIG. 13 and the like).

In this embodiment, the first brake unit 3050*a* is disposed in the surrounded space which is defined by the mounting stay 3071 and the upper side of which is open as described above. Therefore, as shown in FIGS. 18 to 20, the operating arm 3054 in the brake unit 3050*a* can be operated through the upper opening of the surrounded space to thereby simplify a linkage for linking the operating arm 3054 with and to a parking lever 591 and a brake pedal 592 provided in the vicinity of the driver's seat.

Further, in this embodiment, as shown in FIGS. 18 and 19, the first end portions of the oil paths 3101 in the center section 3033 are formed to be oriented upward at a position between the operating arm 3054 in the brake unit 3050*a* and the first main frame 111*a* in the vehicle width direction.

In other words, the first end portions of the oil paths 3101 forming connection portions to the driving actuator (hydraulic pump unit 60*a* in this embodiment) are oriented upward while avoiding the first brake unit 3050*a* in the vehicle width direction.

Therefore, a connecting member (conduit such as high-pressure conduit) between the driving actuator and the hydraulic motor unit can be readily connected to the connection portion (the first end portions of the oil paths 3101 in this embodiment) through the upper opening of the surrounded space.

Lastly, the oil hydraulic circuit of the vehicle 500 to which the axle-driving devices 3*a* and 3*b* according to this embodiment are applied will be described with reference to FIGS. 14 and 15.

As shown in FIG. 14, the charge pump unit 90 suctions oil from an external reservoir tank 800 through a filter 810. Then, pressure oil from the charge pump unit 90 is supplied to charge circuits 900*a* and 900*b* of the first and second HSTs, a working machine lifting/lowering oil hydraulic circuit 910, and the PTO unit engaging/interrupting circuit 920, respectively, at predetermined pressures.

The pressure oil is supplied to the charge circuits 900*a* and 900*b* through charge ports 820 provided to back faces of the respective center sections 64 in the first and second hydraulic pump units 60*a* and 60*b* (see FIGS. 14 and 16). The pressure oil is supplied to the PTO unit engaging/interrupting circuit 920 through a PTO port 830 provided to the case member 610 (see FIGS. 14 and 16).

Hydraulic fluid leaking from the first and second hydraulic pump main bodies 63*a* and 63*b* is gathered into the case member 610 through drain oil paths 840 formed in the pump case 62 and the case member 610 and then returned to the external reservoir tank 800 through an external conduit 850 as shown in FIGS. 14 and 16.

Hydraulic fluid leaking from the first and second hydraulic motor main bodies 3031*a* and 3031*b* is returned to the external reservoir tank 800 through drain ports 860 provided to the respective motor cases 3032 or the respective center sections 3033 in the first and second hydraulic motor units 3020*a* and 3020*b* and the corresponding external conduits 870*a* and 870*b*.

This specification is by no means intended to restrict the present invention to the preferred embodiments set forth therein. Various modifications to the power-dividing device, as well as the axle-driving device as described herein, may be made by those skilled in the art without departing from the spirit and scope of the present invention as defined in the appended claims.

The invention claimed is:

1. A power-dividing device for a working vehicle, comprising:
   a case member;
   an input shaft supported by the case member so that a first end portion of the input shaft can be operatively connected to a driving source;
   a PTO unit having a PTO shaft supported by the case member so as to be parallel and offset with respect to the input shaft;
   a power transmission mechanism accommodated in the case member to transmit power from the input shaft to the PTO shaft; and
   a first hydraulic pump unit which has a first pump shaft arranged parallel to the input shaft and a first pump body driven by the first pump shaft, the first hydraulic pump unit being connected to the case member, wherein
   the first hydraulic pump unit is fluidly-connectable to an actuator through external conduits, the actuator being disposed away from the case member so as to drive a pair of drive wheels; and
   the power transmission from the input shaft to the first pump shaft is performed via the power transmission mechanism.

2. A power-dividing device as set forth in claim 1, in which
   the power transmission mechanism includes a drive-side gear supported on the input shaft in a relatively non-rotatable manner, a counter gear engaged with the drive-side gear, a hollow counter shaft supporting the counter gear in a relatively non-rotatable manner, and a driven-side gear supported on the PTO shaft in a relatively rotatable manner and engaged with the counter gear;
   the first pump shaft is inserted into the counter shaft in a relatively non-rotatable manner; and
   the PTO unit further includes a PTO clutch mechanism for selectively engaging or disengaging power transmission from the drive-side gear to the PTO shaft.

3. A power-dividing device as set forth in claim 1, further comprising:
   a second hydraulic pump unit which has a second pump shaft operatively connected to the input shaft via the power transmission mechanism and a second pump body driven by the second pump shaft, the second hydrualic pump unit being connected to the case member at an opposite side of the first hydraulic pump unit and being fluidly-connectable to another actuator disposed outside of the case member.

4. A power-dividing device as set forth in claim 3, in which
   the power transmission mechanism includes a drive-side gear supported on the input shaft in a relatively non-rotatable manner, a counter gear engaged with the drive-side gear, a hollow counter shaft supporting the counter gear in a relatively non-rotatable manner, and a driven-side gear supported on the PTO shaft in a relatively rotatable manner and engaged with the counter gear;
   the first pump shaft and the second pump shaft are inserted into the counter shaft in a relatively non-rotatable manner; and
   the PTO unit further includes a PTO clutch mechanism for selectively engaging or disengaging power transmission from the drive-side gear to the PTO shaft.

5. A power-dividing device as set forth in claim 3, in which the first and second pump units are formed of the same components.

6. A power-dividing device as set forth in claim 3, in which
   the input shaft extends along a back and forth direction of the vehicle, and has the first end portion, which is on a side closed to the driving source, extending outside from the case member so as to be operatively connected to the driving source and a second end portion, which is on an opposite side of the first end portion, also extending outside from the case member so as to drive a charge pump unit;

one of the first and second hydraulic pump units is connected to one side of the case member in the back and forth direction of the vehicle at a position below the first end portion of the input shaft; and the other of the first and second hydraulic pump units is connected to the other side of the case member in the back and forth direction of the vehicle at a position below the charge pump unit and above an output end portion of the PTO shaft.

7. A power-dividing device as set forth in claim 3, in which each of the first and second hydraulic pump units further includes an output adjusting member for changing a suction-discharge rate of the corresponding pump body and a control shaft capable of controlling a slanting position of the corresponding output adjusting member from outside of the case member;

the input shaft, the first and second pump shafts and the PTO shaft extends in the back and forth direction of the vehicle;

the first hydraulic pump unit is connected to one side of the case member in the back and forth direction of the vehicle so that the corresponding control shaft extends in one side along the vehicle width direction; and the second hydraulic pump unit, which has components equal to those of the first hydraulic pump unit, is connected to the other side of the case member in the back and forth direction of the vehicle so that the corresponding control shaft extends in the other side along the vehicle width direction.

8. A power-dividing device for a working vehicle, comprising:

a case member;

an input shaft supported by the case member so that a first end portion of the input shaft can be operatively connected to a driving source;

a PTO unit having a PTO shaft supported by the case member so as to be offset with respect to the input shaft;

a power transmission mechanism accommodated in the case member to transmit power from the input shaft to the PTO shaft;

a first pump unit which has a first pump shaft operatively connected to the input shaft and which is fluidly-connectable to an actuator disposed outside of the case member; and the first pump shaft disposed between the input shaft and the PTO shaft in a vertical direction.

9. A power-dividing device for a working vehicle, comprising:

a case member;

an input shaft supported by the case member so that a first end portion of the input shaft can be operatively connected to a driving source;

a PTO unit having a PTO shaft supported by the case member so as to be offset with respect to the input shaft;

a power transmission mechanism accommodated in the case member to transmit power from the input shaft to the PTO shaft;

a first pump unit which has a first pump shaft operatively connected to the input shaft and which is fluidly-connectable to an actuator disposed outside of the case member; and a second pump unit which has a second pump shaft operatively connected to the input shaft and which is fluid-connectable to another actuator disposed outside of the case member; wherein the input shaft is disposed along a vehicle back and forth direction, and the first pump unit and the second pump unit are coupled to the same side of the case member in the vehicle back and forth direction.

10. A power-dividing device for a working vehicle, a case member;

an input shaft supported by the case member so that a first end portion of the input shaft can be operatively connected to a driving source;

a PTO unit having a PTO shaft supported by the case member so as to be offset with respect to the input shaft;

a power transmission mechanism accommodated in the case member to transmit power from the input shaft to the PTO shaft;

a first pump unit which has a first pump shaft operatively connected to the input shaft and which is fluid-connectable to an actuator disposed outside of the case member; and a second pump unit which has a second pump shaft operatively connected to the input shaft and which is fluidly-connectable to another actuator disposed outside of the case member; wherein the input shaft is along a vehicle back and forth direction, and the first pump unit and the second pump unit are coupled to a first side and a second side of the case member in the vehicle back and forth direction, respectively.

11. A power-dividing device as set forth in claim 10, in which the first and second pump shafts are disposed coaxially.

* * * * *

UNITED STATES PATENT AND TRADEMARK OFFICE
CERTIFICATE OF CORRECTION

PATENT NO. : 7,370,714 B2 Page 1 of 1
APPLICATION NO. : 10/822096
DATED : May 13, 2008
INVENTOR(S) : Yasuda et al.

It is certified that error appears in the above-identified patent and that said Letters Patent is hereby corrected as shown below:

In claim 7, column 25, line 19, "suction-discharge" should be replaced with --suction/discharge--.

In claim 10, column 26, line 25, "vehicle;" should be replaced with --vehicle, comprising:--.

Signed and Sealed this

Fifth Day of August, 2008

JON W. DUDAS
*Director of the United States Patent and Trademark Office*